US012118853B2

(12) United States Patent
Hawkins et al.

(10) Patent No.: US 12,118,853 B2
(45) **Date of Patent: *Oct. 15, 2024**

(54) GAMING DEVICE WITH MOBILE WIN SELECTOR

(71) Applicant: Aristocrat Technologies, Inc., Las Vegas, NV (US)

(72) Inventors: Ryan Hawkins, Henderson, NV (US); Stephanie Klepzig, Las Vegas, NV (US); Yanis Tsombanidis, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,878

(22) Filed: Jan. 22, 2024

(65) Prior Publication Data

US 2024/0161582 A1 May 16, 2024

Related U.S. Application Data

(63) Continuation of application No. 17/701,576, filed on Mar. 22, 2022, now Pat. No. 11,922,768.

(60) Provisional application No. 63/165,598, filed on Mar. 24, 2021.

(51) Int. Cl.
*G07F 17/32* (2006.01)
*G07F 17/34* (2006.01)

(52) U.S. Cl.
CPC .......... *G07F 17/3262* (2013.01); *G07F 17/34* (2013.01)

(58) Field of Classification Search
CPC .... G07F 17/32; G07F 17/3211; G07F 17/326; G07F 17/3265; G07F 17/3267; G07F 17/34
See application file for complete search history.

(56) References Cited

U.S. PATENT DOCUMENTS

| | | | |
|---|---|---|---|
| 6,251,013 | B1 | 6/2001 | Bennett |
| 6,419,579 | B1 | 7/2002 | Bennett |
| 7,192,347 | B1 | 3/2007 | Marks |

(Continued)

OTHER PUBLICATIONS

Office Action (Non-Final Rejection) dated Jul. 17, 2023 for U.S. Appl. No. 17/701,576 (pp. 1-12).

(Continued)

*Primary Examiner* — Milap Shah
(74) *Attorney, Agent, or Firm* — Brownstein Hyatt Farber Schreck, LLP

(57) ABSTRACT

A movable box, indicator, or other area-based selector may determine whether a game instance generates a payout to a player (e.g., the player "wins"). Thus, the selector may be used to control either or both of a return to player ("RTP") or volatility. The selector may change its position between games or during a game, such as while values for one or more positions on a playing field are undetermined, move (e.g., change its position) in a random or semi-random fashion, change its size between games or during a game, such that it encompasses more or fewer positions on the playing field than during the previous game, or be used to control either or both of a gaming device's RTP or volatility. The selector's position, size, or the like may vary between games to ensure that the gaming device's RTP and/or volatility remain within acceptable ranges.

20 Claims, 15 Drawing Sheets

(56) References Cited

U.S. PATENT DOCUMENTS

| | | | | |
|---|---|---|---|---|
| 9,022,849 | B2 | 5/2015 | Montenegro | |
| 9,117,333 | B2 * | 8/2015 | Nakamura | G07F 17/34 |
| 9,153,091 | B2 | 10/2015 | Berman | |
| 10,902,702 | B1 * | 1/2021 | Sanborn | G06Q 50/34 |
| 11,922,768 | B2 * | 3/2024 | Hawkins | G07F 17/34 |
| 2005/0054436 | A1 | 3/2005 | Frizzell | |
| 2005/0255903 | A1 | 11/2005 | Jackson | |
| 2005/0288087 | A1 | 12/2005 | Meyer | |
| 2006/0030387 | A1 | 2/2006 | Jackson | |
| 2006/0068873 | A1 | 3/2006 | Gomez | |
| 2007/0026923 | A1 | 2/2007 | Muir | |
| 2007/0287523 | A1 | 12/2007 | Esses | |
| 2008/0125214 | A1 | 5/2008 | Seelig | |
| 2008/0176620 | A1 | 7/2008 | Berman | |
| 2008/0176634 | A1 * | 7/2008 | Berman | G07F 17/34 463/20 |
| 2008/0287178 | A1 * | 11/2008 | Berman | G07F 17/3211 463/20 |
| 2018/0130303 | A1 | 5/2018 | Lamb | |
| 2018/0130308 | A1 | 5/2018 | Berman | |
| 2021/0134120 | A1 | 5/2021 | Sanborn | |
| 2023/0005340 | A1 | 1/2023 | Guerrero | |

OTHER PUBLICATIONS

Office Action (Notice of Allowance and Fees Due (PTOL-85)) dated Nov. 9, 2023 for U.S. Appl. No. 17/701,576 (pp. 1-7).

Office Action (Notice of Allowance and Fees Due (PTOL-85)) dated Jan. 23, 2024 for U.S. Appl. No. 17/701,576 (pp. 1-5).

* cited by examiner

GAMING DEVICE WITH MOBILE WIN SELECTOR

CROSS-REFERENCE TO RELATED APPLICATIONS

This application is a continuation of U.S. patent application Ser. No. 17/701,576, filed Mar. 22, 2022, which claims the benefit under 35 U.S.C. 119(e) of U.S. Provisional Patent Application No. 63/165,598, filed on Mar. 24, 2021, the contents of which are incorporated herein by reference as if fully disclosed herein.

FIELD

The described embodiments relate generally to gaming devices and, more particularly, to gaming devices configured to control a return to player and volatility through the use of a mobile selector that determines whether a wager is won.

BACKGROUND

Gaming devices may be used to provide a variety of wagering games such as slot games, video poker games, video blackjack games, roulette games, video bingo games, keno games, and other types of games that are frequently offered at casinos and other locations. Play on gaming devices typically involves a player establishing a credit balance by inputting money, or another form of monetary credit, and placing a wager from the credit balance on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens, or other forms of payout. In the case of "game credits" that are awarded during play, the game credits are typically added to a credit meter total on the gaming device and may be provided to the player upon completion of a gaming session or when the player wants to "cash out."

Gaming devices may include a display, or multiple displays, on which to display graphics or animations to a player. The display may present information concerning the particular wagering game being played. Information provided on the display may be controlled, or otherwise affected, by a player input. In this way, the player may control some aspect of the wagering game including, for example, interacting with graphical elements, making a wager, and so on. Displays may receive a user input (e.g., a touch input) and/or may be operatively coupled to other mechanisms for receiving a player input (e.g., a button or switch).

SUMMARY

Embodiments described herein generally relate to gaming devices that use a movable box, indicator, or other area-based selector (collectively, a "selector") to determine whether a particular instance of a game generates a payout to a player (e.g., the player "wins"). Thus, the selector may be used to control either or both of a return to player ("RTP") or volatility of the gaming device. The selector may change its position between games or during a game, such as while values for one or more positions on a playing field are undetermined. The selector may move (e.g., change its position) in a random or semi-random fashion. The selector may change its size between games or during a game, such that it encompasses more or fewer positions on the playing field than during the previous game. The size of the selector may be determined randomly with respect to a probability table, such that larger selectors (e.g., selectors encompassing more positions) may be less likely to occur than smaller selectors (e.g., selectors encompassing fewer positions). Generally, any prize symbol within the selector (or otherwise indicated by the selector) generates a payout to the player, while prize symbols outside the selector (or otherwise not indicated by the selector) are ignored and do not generate any winnings for the player, although in some embodiments such prize symbols or bonus symbols may provide a benefit to the player.

All of the selector's foregoing capabilities may be used to control either or both of a gaming device's RTP or volatility, and the selector's position, size, or the like may vary between games to ensure that the gaming device's RTP and/or volatility remain within acceptable ranges. This is especially useful as a gaming device with a random, or semi-random, selector that determines player wins may not easily implement conventional strategies to control RTP or volatility.

One embodiment described herein takes the form of a gaming device, comprising: a housing; a display connected to the housing; and a processor; wherein the processor is operative to: randomly assign, from a set of reels, a subset of reels to a set of columns of the playing field, such that each of the subset of reels corresponds to a column of the set of columns; generate a playing field by randomly determining a set of symbols for each column from the corresponding reel, each of the set of symbols occupying a position on the playing field; instruct the display to display the playing field; randomly determine a size of the mobile selector with reference to a lookup table having a distribution of sizes, the distribution of sizes weighted such that the size of the mobile selector converges to a predetermined average size across a series of games; determine a position of a mobile selector on the playing field; determine whether the mobile selector encompasses a prize symbol; in the event the mobile selector encompasses a prize symbol, paying a player; and in the event the mobile selector does not encompass a prize symbol, ending the game without paying the player.

Another embodiment takes the form of a method for establishing a playing field and using a mobile selector to determine a win or loss of a game by a player, comprising: determining a set of reels used to establish the playing field; establishing the playing field by selecting portions of the set of reels to constitute the playing field; pseudo-randomly determining a position of a mobile selector; and in the event the portion of the reel within the mobile selector is a prize or bonus symbol, awarding a prize to the player.

Yet another embodiment takes the form of a computer-readable medium containing instructions which, when executed, cause at least one server connected to a gaming device to: randomly determine a set of reels used to establish a playing field on the gaming device by randomly selecting each of the set of reels from a larger number of reels; establish the playing field on the gaming device by randomly assigning each of the set of reels to a column of the playing field; determine a size of a mobile selector by selecting an entry in a lookup table from a set of entries, each of the set of entries having a probability of selection, at least some of the probabilities of selection differing from one another; pseudo-randomly determine a position of a mobile selector by moving the mobile selector according to a fixed movement component and a random movement component; and in the event the portion of the reel within the mobile selector is a prize or bonus symbol, awarding a prize to the player at the gaming device.

BRIEF DESCRIPTION OF THE DRAWINGS

Reference will now be made to representative examples illustrated in the accompanying figures. It should be understood that the following descriptions are not intended to limit the examples to one or more preferred examples. To the contrary, they are intended to cover alternatives, modifications, and equivalents as may be included within the spirit and scope of the described examples as defined by the appended claims. Similar reference numbers have been used, where possible, to designate similar features that are common between the figures.

DETAILED DESCRIPTION

Figure 1:
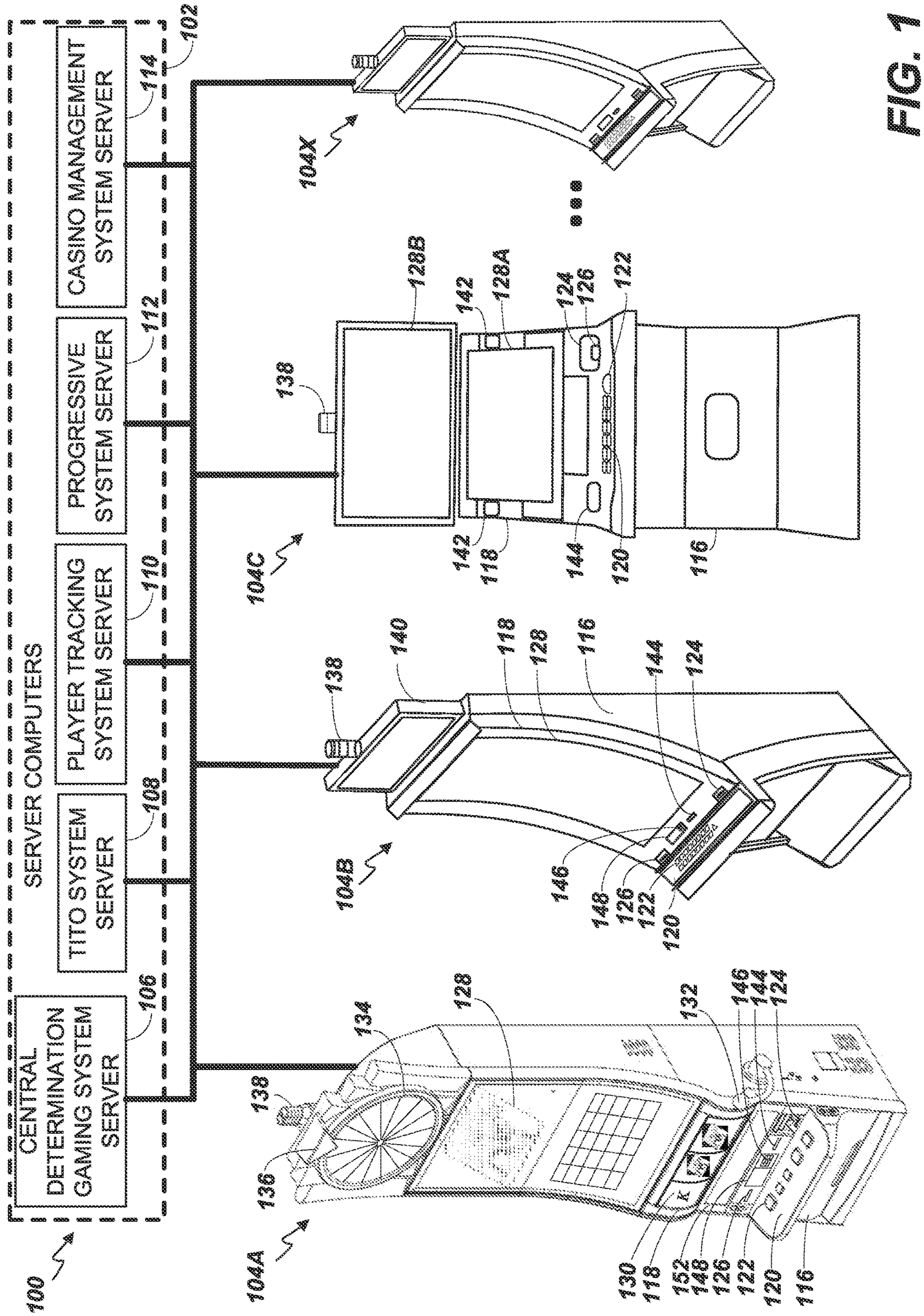
FIG. 1 is an exemplary diagram showing several electronic gaming machines (EGMs) networked with various gaming related servers.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein generally relate to gaming devices, whether handheld, online, standalone gaming machines, or otherwise implemented) that use a movable box, indicator, or other area-based selector (collectively, a "selector") to determine whether a particular instance of a game generates a payout to a player (e.g., the player "wins"). The use of a mobile selector in a gaming device implements a unique and unprecedented methodology to determine a user's payout in a slot-type game. Typical existing slot-type games utilize pay lines to determine a user's payout (if any). These pay lines are generally static and set for every game played on the gaming device, whether a single pay line or 40 pay lines are used. By contrast, the mobility of the selector provides a constantly changing payout mechanic not previously known.

The use of a mobile selector that moves randomly or pseudo-randomly, as those terms are used herein, presents unique issues in a gaming environment. The random/pseudo-random motion of the selector introduces an additional variable that impacts both volatility of the game and a return to the player. Accordingly, gaming devices incorporating a mobile selector face unique challenges that conventional slot machines do not. Specifically, gaming devices that incorporate a mobile selector must account for the random element of the selector's motion while controlling or setting both volatility and return to player. "Random" movement generally means that a position of a mobile selector on a playing field is randomly determined each game or for a series of games. "Pseudo-random" movement generally means that the mobile selector's movement has both a fixed movement component and a random movement component. Put another way, the mobile selector moves pseudo-randomly if one aspect of its movement is determinative or fixed prior to its motion while another aspect of its movement is randomly determined.

The selector may be used to control either or both of a return to player ("RTP") or volatility of the gaming device, thereby providing functionality that otherwise does not exist. The selector may change its position between games or during a game, such as while values for one or more positions on a playing field are undetermined. The selector may move (e.g., change its position) in a random or semi-random fashion. The selector may change its size between games or during a game, such that it encompasses more or fewer positions on the playing field than during the previous game. The size of the selector may be determined randomly with respect to a probability table, such that larger selectors (e.g., selectors encompassing more positions) may be less likely to occur than smaller selectors (e.g., selectors encompassing fewer positions). Generally, this probability table is configured to achieve, on average, a given, predetermined selector size. The predetermined selector size corresponds to a predetermined or desired RTP and/or volatility.

Alternatively, a player may specify a size and/or position of the selector during, or prior to, a game. Generally, any prize symbol within the selector (or otherwise indicated by the selector) generates a payout, increment, bonus, feature, or other benefit to the player, while prize symbols outside the selector (or otherwise not indicated by the selector) are ignored and do not generate any winnings or benefits for the player, although in some embodiments such prize symbols or bonus symbols may provide a benefit to the player. Example of symbols may be credit values, jackpot values, jackpot payout triggers, progressive values, feature triggers that cause a gaming device to execute certain functionality, awards of bonus games, multipliers, or the like. Games may pay when a certain number and/or type of symbols appear in a selector in a single game or across multiple games, after a number of games, according to a graduated pay table or a static pay table, as multiple symbols appear in a selector (which may increase a payout linearly or non-linearly), progressively, and so on.

All of the selector's foregoing capabilities may be used to control either or both of a gaming device's RTP or volatility, and the selector's position, size, or the like may vary between games, in addition to (or instead of) varying assignment of reels to particular columns and/or reel symbol density, in order to ensure that the gaming device's RTP and/or volatility remain within acceptable ranges. This is especially useful as a gaming device with a random, or semi-random, selector that determines player wins may not easily implement conventional strategies to control RTP or volatility, as discussed herein.

In addition to the mobile selector, gaming devices described herein may use or implement a variety of reels to control either or both of RTP and volatility. Further, the reels may function with the mobile selector to collectively control volatility and/or RTP.

Generally, multiple reels may cooperate to define a playing field that is shown on a display of the gaming device. The playing field may define a number of individual positions, typically (although not necessarily) laid out in a rectangular matrix. Symbols for every position in a single column of the playing field are determined by a single reel, such that, with respect to a gaming device displaying an N×M playing field on its display (where N is the number of rows and M is the number of columns), M reels are used to determine the values of the playing field and N symbols of each reel are shown on the playing field in any given game. Each reel may have a particular pattern of symbols, some of which may be blank symbols. Generally, blank symbols do not generate any payout to a player when they appear in the selector while other symbols do. The pattern of symbols on a reel may help achieve a designated RTP. For example, reels having more paying symbols may provide higher RTP than reels with fewer paying symbols. Similarly, grouping paying symbols near one another with groups of blank symbols in between such groups may increase RTP (and, potentially, raise volatility) as opposed to smaller groups of paying symbols separated by smaller groups of blank symbols. As another non-limiting example of how symbol groupings on reels may affect volatility, a reel having grouped prize symbols with multiple blank symbols between each group may lead to more prize symbols being simultaneously displayed on a playing field, thereby increasing the odds that the mobile selector encompasses one or more such symbols. This, in turn, leads to higher volatility.

Gaming devices employing a mobile selector must account for the motion of the selector and its random elements when determining a player payout. Put another way, the inherent unpredictability of the mobile selector's motion (whether random or pseudo-random) introduces another variable that must be accounted for when determining volatility and RTP of the device. Broadly, the RTP and volatility of a game executing on the gaming device is generally based on three factors: 1) a symbol density of each reel strip; 2) a size of a mobile selector (e.g., how many symbols the selector encompasses); and 3) motion of the mobile selector. It should be noted, however, that the mobile selector's motion does not affect RTP for a given play if each of the reels are identical, or at least have the same distribution of symbols that result in a payout. In such an embodiment, though, gameplay is fairly predictable.

To avoid predictable outcomes, different reel strips may be used for different columns of the playing field, as mentioned above. However, the use of different reel strips in a gaming device causes RTP and volatility to vary as the mobile selector moves from column to column of the playing field.

Certain embodiments may utilize a set of reels, each of which has a different distribution of symbols, to construct the playing field. The "distribution" of symbols for each reel may vary in the type of symbols used for each reel, the positioning of symbols relative to one another for each reel, and/or a density of symbols for each reel. The playing field can be constructed by randomly assigning, by a processor of the gaming device or a remote processor that is configuring the gaming device, a separate reel to each column of the playing field. By randomly assigning reels to columns to construct the playing field, across a sufficient time the RTP and/or volatility of the gaming device converges to a given value even though the mobile selector moves randomly or pseudo-randomly. Further, in some embodiments a given reel or reels may be assigned to multiple columns of a playing field, while in other embodiments each column may be assigned a unique reel.

In certain embodiments, the payout of the gaming device varies with the symbol density of the reels. For example, any given reel may have blank (non-paying or inactive) symbols in certain positions and paying or active symbols in other positions. As the ratio of active to inactive symbols (e.g., density) increases, so too does the probability that the mobile selector encompasses an active symbol and thus that a user is paid for any given game. Thus, increases in symbol density for a reel or set of reels increases volatility and return to player for the gaming device.

Likewise, in certain embodiments the payout of the gaming device may vary with a size of the mobile selector. For example, the size of the mobile selector may vary from spin to spin of the gaming device. The size of the gaming device may be determined by using a lookup table or algorithm. The lookup table may have multiple entries, each of which corresponds to a different size of the mobile selector and each of which has a different weight or probability. Higher-weighted entries are more likely to be used to set the mobile selector size while lower-weighted entries are less likely to be used. As the size of the mobile selector increases, the RTP and/or volatility likewise increase. By using a weighted lookup table or an algorithm that generates a similarly weighted set of outcomes to determine the size of the mobile selector, average RTP and/or volatility across a sufficiently large series of games will converge to a given or predetermined value.

The gaming device may use the same reel for multiple columns or even all columns in some embodiments, which may serve to lower volatility even when a randomly-moving selector is employed to determine whether or not a player wins a given game. Since all reels are identically patterned in such an embodiment, the column in which the selector appears affects neither RTP nor volatility; only the row would do so.

As another option, for an N×M playing field, the gaming device may use M total reels and randomize to which particular column a given reel is assigned. This random assignment may change with each game (or spin), after a certain number of games, during bonus games, between bets, cash-ins, or players, or the like. Such an implementation generally provides more randomness and reduces a likelihood that a player will detect any pattern to the reels during play, while simultaneously increasing player engagement and interest.

As yet another option to address the aforementioned predictability, RTP control, and volatility control issues inherent in a mobile selector, each column may have a set of possible reels from which a given reel is assigned for a game. For example, a first column may have reels A-C as possible options, a second column may have reels D-F as possible options, and so on. Some reels may be options for more than one column, and some columns may have more or fewer reels in their set than other columns. Further, each of the reels in a given set may have the same payout probabilities, although with different symbol patterns, or some may differ from one another. Likewise, each set may have an overall payout probability (and thus an overall RTP and/or volatility) that is determined, in part, by weighting how likely each reel in the set is to be assigned to the column. In these implementations, the reels chosen to determine the playing field constantly change and so the player may perceive little or no pattern during play.

Thus, the implementation of a gaming device incorporating a mobile selector not only provides a way to adjust and/or control both a return to player and volatility in a unique way with a unique capability, but also enhances usability of the gaming device by providing a player with a unique gaming mechanism.

These and other embodiments will be discussed below with respect to FIGS. 1-4. The various reels and their implementations to construct or select a playing field, as described above, may be used with any implementation described herein and specifically with any playing field shown in FIGS. 3A-3H.

FIG. 1 illustrates several different models of gaming devices which may be networked to various gaming related servers. Shown is a system 100 in a gaming environment that includes one or more server computers 102 (e.g., slot servers of a casino) that are in communication, via a communications network, with one or more gaming devices 104A-104X (online gaming mechanisms, games operating on a handheld computing device slot machines, video poker, bingo machines, etc.) that may implement one or more aspects of the present disclosure. The gaming devices 104A-104X may alternatively be portable and/or remote gaming devices such as, but not limited to, a smart phone, a tablet, a laptop, or a game console. Gaming devices 104A-104X may utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 may communicate over one or more communication networks, such as over the Internet through a website maintained by a computer on a remote server or over an online data network including commercial online service providers, Internet service providers (ISPs), private networks (e.g., local area networks (LANs) and enterprise networks), and the like (e.g., wide area networks). The communication networks could allow gaming devices 104A-104X to communicate with one another and/or the server computers 102 using a variety of communication-based technologies, such as radio-frequency (RF) (e.g., wireless fidelity (Wi-Fi®) and Bluetooth®), cable TV, satellite links, and so on.

In some implementations, server computers 102 may not be necessary and/or preferred. For example, in one or more implementations, a stand-alone gaming device such as gaming device 104A, gaming device 104B or any of the other gaming devices 104C-104X may implement one or more aspects of the present disclosure. However, it is typical to find multiple gaming devices connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, and so on). For example, game outcomes may be generated on a central determination gaming system server 106 and may then be transmitted over the network to any of a group of remote terminals or remote gaming devices 104A-104X that utilize the game outcomes and display the results to the players.

A gaming device 104A is often of a cabinet construction which may be aligned in rows or banks of similar devices for placement and operation on a casino floor. The gaming device 104A may include a main door which provides access to the interior of a main cabinet 116. The gaming device 104A may further include a button area or button deck 120 accessible by a player that is configured with input switches or buttons 122, an access channel for a bill validator 124, and/or an access channel for a ticket-out printer 126.

In FIG. 1, the gaming device 104A is shown as a Relm XL™ model gaming device manufactured by Aristocrat® Technologies, Inc. As shown, the gaming device 104A is a reel machine having a gaming display area 118 comprising a number (typically 3 or 5) of mechanical reels 130 with various symbols displayed on them. The mechanical reels 130 may be independently spun and stopped to show a set of symbols within the gaming display area 118 and may be used to determine an outcome to a game.

In many configurations, the gaming device 104A may have a main display 128 (e.g., a video display monitor) mounted to, or above, the gaming display area 118. The main display 128 may be a high-resolution liquid crystal display (LCD), plasma, light-emitting diode (LED), organic light emitting diode (OLED) panel, which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket TITO system). In such cashless implementations, the gaming device 104A may also include a "ticket-out" printer 126 for outputting a credit ticket when a "cash out" button is pressed. Cashless TITO systems may be used to generate and track unique bar-codes or other indicators printed on tickets to allow players to avoid the use of bills and coins by loading credits using a ticket reader and cashing out credits using a ticket-out printer 126 on the gaming device 104A. The gaming device 104A may additionally have hardware meters for purposes including ensuring regulatory compliance and monitoring the player credit balance. In addition, there may be additional meters that record the total amount of money wagered on the gaming device, the total amount of money deposited, the total amount of money withdrawn, the total amount of winnings on gaming device 104A, and so on.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information may be provided in gaming device 104A. In such implementations, a game controller within the gaming device 104A may communicate with the player tracking system server 110 to send and receive player tracking information.

Gaming device 104A may also include a bonus topper wheel 134. When bonus play is triggered (e.g., by a player achieving a particular outcome or set of outcomes in the primary game), the bonus topper wheel 134 may be operative to spin and stop with indicator arrow 136 indicating the outcome of the bonus game. The bonus topper wheel 134 may be used to play a bonus game, but could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 may also be used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A may also include a handle 132 typically mounted to the side of main cabinet 116 which may be used to initiate gameplay.

Figure 2A:
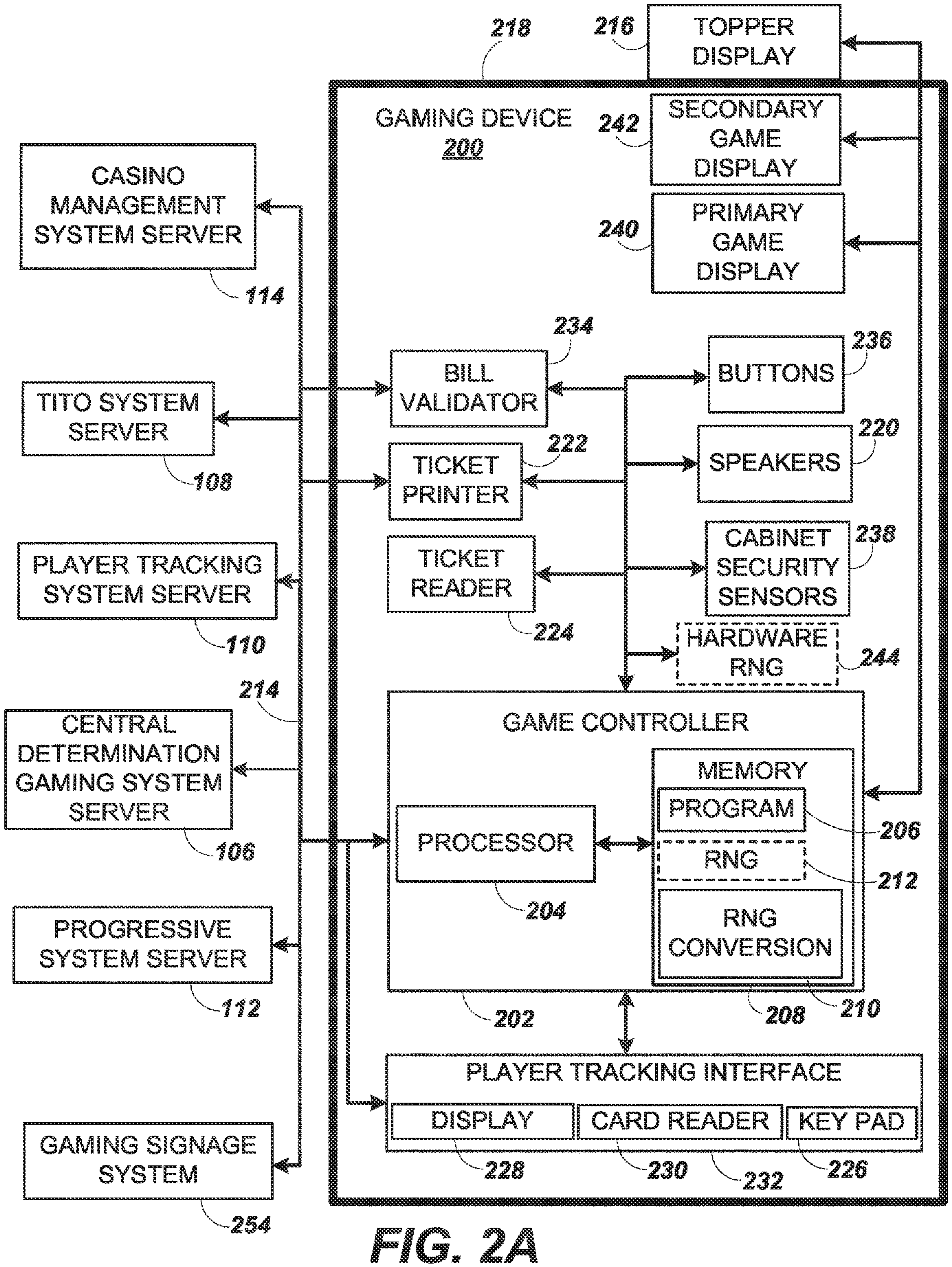
FIG. 2A is a block diagram showing various functional elements of an exemplary EGM.

Many or all the above described components may be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that, where possible, reference numerals identifying similar features of the gaming device 104A implementation are also identified in the gaming device 104B implementation using the same reference numbers. The gaming device 104B may not include physical reels and may instead show gameplay functions on a main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B may include a main cabinet 116 including a main door which opens to provide access to the interior of the gaming device 104B. The main or service door may be used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. The gaming device 104C may include a main display 128A that is in a landscape orientation. Although not illustrated by the front view provided, the main display 128A may have a curvature radius from top to bottom, or alternatively from side to side. In some implementations, the main display 128A may be a flat panel display. The main display 128A may be used for primary gameplay while a secondary display 128B may be used for bonus gameplay, to show game features or attraction activities while the game is not in play, or any other information or media desired by the game designer or operator. In some implementations, the example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and so on, and may be deployed for operation in Class 2, Class 3, and so on. The gaming device 104X may represent any kind of gaming device and may include components similar to those in depicted gaming devices 104A-104C.

FIG. 2A is a block diagram depicting exemplary internal electronic components of a gaming device 200 connected to various external systems. All or parts of the gaming device 200 shown could be used to implement any one of the example gaming devices 104A-104X depicted in FIG. 1. As shown in FIG. 2A, the gaming device 200 includes a topper display 216 or another form of a top box (e.g., a topper wheel, a topper screen, and so on) that sits above a cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. FIG. 2 also depicts utilizing a ticket printer 222 to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each display coupled to and operable under the control of a game controller 202.

The games available for play on the gaming device 200 may be controlled by a game controller 202 that includes a processor 204. The processor 204 may represent a general-purpose processor, a specialized processor intended to perform certain functional tasks, a combination thereof, and so on. As an example, the processor 204 may be a central processing unit (CPU) that has one or more multi-core processing units and memory mediums (e.g., cache memory) that function as buffers and/or temporary storage for data. Alternatively, the processor 204 may be a specialized processor, such as an application specific integrated circuit (ASIC), graphics processing unit (GPU), field-programmable gate array (FPGA), digital signal processor (DSP), or another type of hardware accelerator. In another example, the processor 204 may be a system on chip (SoC) that combines and integrates one or more general-purpose processors and/or one or more specialized processors. Although FIG. 2A illustrates that the game controller 202 includes a single processor 204, the game controller 202 is not limited to this representation and may include multiple processors 204 (e.g., two or more processors).

FIG. 2A illustrates that the processor 204 is operatively coupled to a memory 208. The memory 208 is defined herein as including volatile and/or nonvolatile memory and other types of non-transitory data storage components. Volatile memory is memory that does not retain data values upon loss of power. Nonvolatile memory is memory that does retain data upon a loss of power. Examples of the memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, a combination of any two or more of these memory components, and so on. In addition, examples of RAM include static random-access memory (SRAM), dynamic random-access memory (DRAM), magnetic random access memory (MRAM), and other devices. Examples of ROM include a programmable read-only memory (PROM), an erasable programmable read-only memory (EPROM), an electrically erasable programmable read-only memory (EEPROM), or other memory device. Even though FIG. 2A illustrates that the game controller 202 includes a single memory 208, game controller 202 could include multiple memories 208 for storing program instructions and/or data.

The memory 208 may store one or more game programs 206 that provide program instructions and/or data for carrying out various implementations (e.g., game mechanics) described herein. Stated another way, a game program 206 represents an executable program stored in any portion or component of the memory 208. In one or more implementations, the game program 206 is embodied in the form of source code that includes human-readable statements written in a programming language or machine code that contains numerical instructions recognizable by a suitable execution system, such as a processor 204 in a game controller 202 or other system. Examples of executable programs include: (1) a compiled program that may be translated into machine code in a format that may be loaded into a random access portion of a memory 208 and run by processor 204; (2) source code that may be expressed in proper format such as object code that is capable of being loaded into a random access portion of a memory 208 and executed by a processor 204; and (3) source code that may be interpreted by another executable program to generate instructions in a random access portion of a memory 208 to be executed by a processor 204.

Alternatively, a game program 206 may be set up to generate one or more game instances based on instructions and/or data that the gaming device 200 exchanges with one or more remote gaming devices, such as a central determination gaming system server 106 (not shown in FIG. 2A but depicted in FIG. 1). For purpose of this disclosure, the term "game instance" refers to a play or a round of a game that the gaming device 200 presents (e.g., via a user interface (UI)) to a player. The game instance may be communicated to the gaming device 200 via the network 214 and then displayed on gaming device 200. For example, the gaming device 200 may execute the game program 206 as video streaming software that allows the game to be displayed on the gaming device 200. When a game is stored on the gaming device 200, it may be loaded from the memory 208 (e.g., from a read only memory (ROM)) or from the central determination gaming system server 106 to the memory 208.

Gaming devices, such as the gaming device 200, are highly regulated to ensure fairness and, in some cases, the gaming device 200 is operable to award monetary awards (e.g., dispensed in the form of a redeemable voucher). Therefore, to satisfy security and regulatory requirements in a gaming environment, hardware and software architectures are implemented in the gaming device 200 that may differ from those of general-purpose computers. Adapting general purpose computers to function as gaming devices 200 may not be simple or straightforward because of: (1) the regulatory requirements for the gaming device 200, (2) the harsh environment in which the gaming device 200 operate, (3) security requirements, (4) fault tolerance requirements, and (5) the requirement for additional special purpose componentry enabling functionality of a gaming device. These differences require substantial engineering effort with respect to game design implementation, game mechanics, hardware components, and software.

One regulatory requirement for games running on the gaming device 200 generally involves complying with a certain level of randomness. Gaming jurisdictions may mandate that gaming devices satisfy a minimum level of randomness without specifying how a gaming device should achieve this level of randomness. To comply, FIG. 2A illustrates that the gaming device 200 may include a random number generator (RNG) 212 that utilizes hardware and/or software to generate RNG outcomes that lack any pattern. The RNG operations may be specialized and non-generic in order to comply with regulatory and gaming requirements. For example, in a slot game, the game program 206 may initiate multiple RNG calls to RNG 212 to generate RNG outcomes, where each RNG call and RNG outcome corresponds to an outcome for a reel. In another example, the gaming device 200 may be a Class 2 gaming device where the RNG 212 generates RNG outcomes for creating bingo cards. In one or more implementations, the RNG 212 could be one of a set of RNGs operating on the gaming device 200. More generally, an output of the RNG 212 may be the basis on which game outcomes are determined by the game controller 202. Game developers could vary the degree of true randomness for each RNG (e.g., pseudorandom) and utilize specific RNGs depending on game requirements. The output of the RNG 212 may include a random number or pseudorandom number (either is generally referred to as a "random number").

In FIG. 2A, the RNG 212 and a hardware RNG 244 are shown in dashed lines to illustrate that the RNG 212, the hardware RNG 244, or both, may be included in the gaming device 200. In some implementations, instead of including the RNG 212, the gaming device 200 may include a hardware RNG 244 that generates RNG outcomes. Analogous to the RNG 212, the hardware RNG 244 may perform specialized and non-generic operations in order to comply with regulatory and gaming requirements. For example, because of regulation requirements, the hardware RNG 244 may be a random number generator that securely produces random numbers for cryptography use. The gaming device 200 may then use the secure random numbers to generate game outcomes for one or more game features. In additional or alternative implementations, the gaming device 200 may include both the hardware RNG 244 and the RNG 212. The RNG 212 may additionally or alternatively utilize the RNG outcomes from the hardware RNG 244 as one of many sources of entropy for generating secure random numbers for the game features.

Another regulatory requirement for running games on the gaming device 200 includes ensuring a certain level of Return to Player (RTP) payouts Similar to the randomness requirement discussed above, numerous gaming jurisdictions may also mandate that a gaming device provides a minimum level of RTP (e.g., RTP of at least 75%). A game may use one or more lookup tables (also called weighted tables) as part of a technical solution that satisfies regulatory requirements for randomness and RTP. In particular, a lookup table may integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table may involve engineering decisions with respect to how RNG outcomes are mapped to game outcomes for a given game feature, while still satisfying regulatory requirements for RTP. Configuring a lookup table may also involve engineering decisions about whether different game features are combined in a given entry of the lookup table or split between different entries (for the respective game features), while still satisfying regulatory requirements for RTP and allowing for varying levels of game volatility.

FIG. 2A illustrates that the gaming device 200 includes a RNG conversion engine 210 that translates the RNG outcome from the RNG 212 to a game outcome presented to a player. To meet a designated RTP, a game developer may set up the RNG conversion engine 210 to utilize one or more lookup tables to translate the RNG outcome to a symbol element, stop position on a reel strip layout, and/or randomly chosen aspect of a game feature. As an example, the lookup tables may regulate a prize payout amount for each RNG outcome and how often the gaming device 200 pays out the prize payout amounts. The RNG conversion engine 210 may utilize one lookup table to map the RNG outcome to a game outcome displayed to a player and a second lookup table as a pay table for determining the prize payout amount for each game outcome. The mapping between the RNG outcome to the game outcome may partially or entirely control the frequency in hitting certain prize payout amounts.

FIG. 2A also depicts that the gaming device 200 is connected over network 214 to a player tracking system server 110. The player tracking system server 110 may be, for example, an OASIS® system manufactured by Aristocrat® Technologies, Inc. The player tracking system server 110 may be used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs may reward players for their play and may help build brand loyalty to the gaming establishment. The rewards typically correspond to the player's level of patronage (e.g., to the player's playing frequency and/or total amount of gameplays at a given casino). Player tracking rewards may be complimentary and/or discounted meals, lodging, entertainment and/or additional play. Player tracking information may be combined with other information that may be readily obtainable by a casino management system.

When a player wishes to play the gaming device 200, he/she may insert cash or a ticket voucher through a coin acceptor (not shown) or bill validator 234 to establish a credit balance on the gaming device. The credit balance may be used by the player to place wagers on instances of the game and to receive credit awards based on the outcome of winning instances. The credit balance may be decreased by the amount of each wager and may be increased upon a win. The player may add additional credits to the balance at any time. The player may also optionally insert a loyalty club card into the card reader 230. During the game, the player may view, with one or more user interfaces (UIs), the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In some games, the player may be asked to initiate or select options during course of gameplay (such as spinning a wheel to begin a bonus round or select various items during a feature game). The player may make these selections using the player-input buttons 236, the primary game display 240 which may be a touch screen, or using another device which enables a player to input information into the gaming device 200.

During certain game events, the gaming device 200 may display visual and auditory effects that may be perceived by the player. These effects may add to the excitement of a game, which may make a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (see FIG. 1).

When the player is done, he/she may cash out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 may include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment may include detecting the presence of mobile devices; performing credit, points, comps, or other marketing or hard currency transfers; establishing wagering sessions; providing a personalized casino-based experience using a mobile application; and so on. In some implementations, to perform these wireless operations, a wireless transmitter or transceiver may initiate a secure wireless connection between a gaming devices 104A-104X and/or 200 and a mobile device. After establishing a secure wireless connection between the gaming devices 104A-104X and/or 200 and the mobile device, the wireless transmitter or transceiver may not send and/or receive application data to and/or from the mobile device. Rather, the mobile device communicates with gaming devices 104A-104X and/or 200 may use another wireless connection (e.g., Wi-Fi® or cellular network). In alternative or additional implementations, a wireless transceiver may establish a secure connection to directly communicate with the mobile device. The mobile device and gaming device 104A-104X and/or 200 may send and receive data utilizing the wireless transceiver instead of utilizing an external network. For example, the mobile device may perform digital wallet transactions by directly communicating with the wireless transceiver. In some implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and/or 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices may only have a single game display that includes only a mechanical set of reels and/or a video display, while others may be designed for bar counters or tabletops and have displays that face upwards. Gaming devices 104A-104X and 200 may also include other processors that are not separately shown. Using FIG. 2A as an example, a gaming device 200 may include display controllers (such as a game pad, keyboard, or button-based input, not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
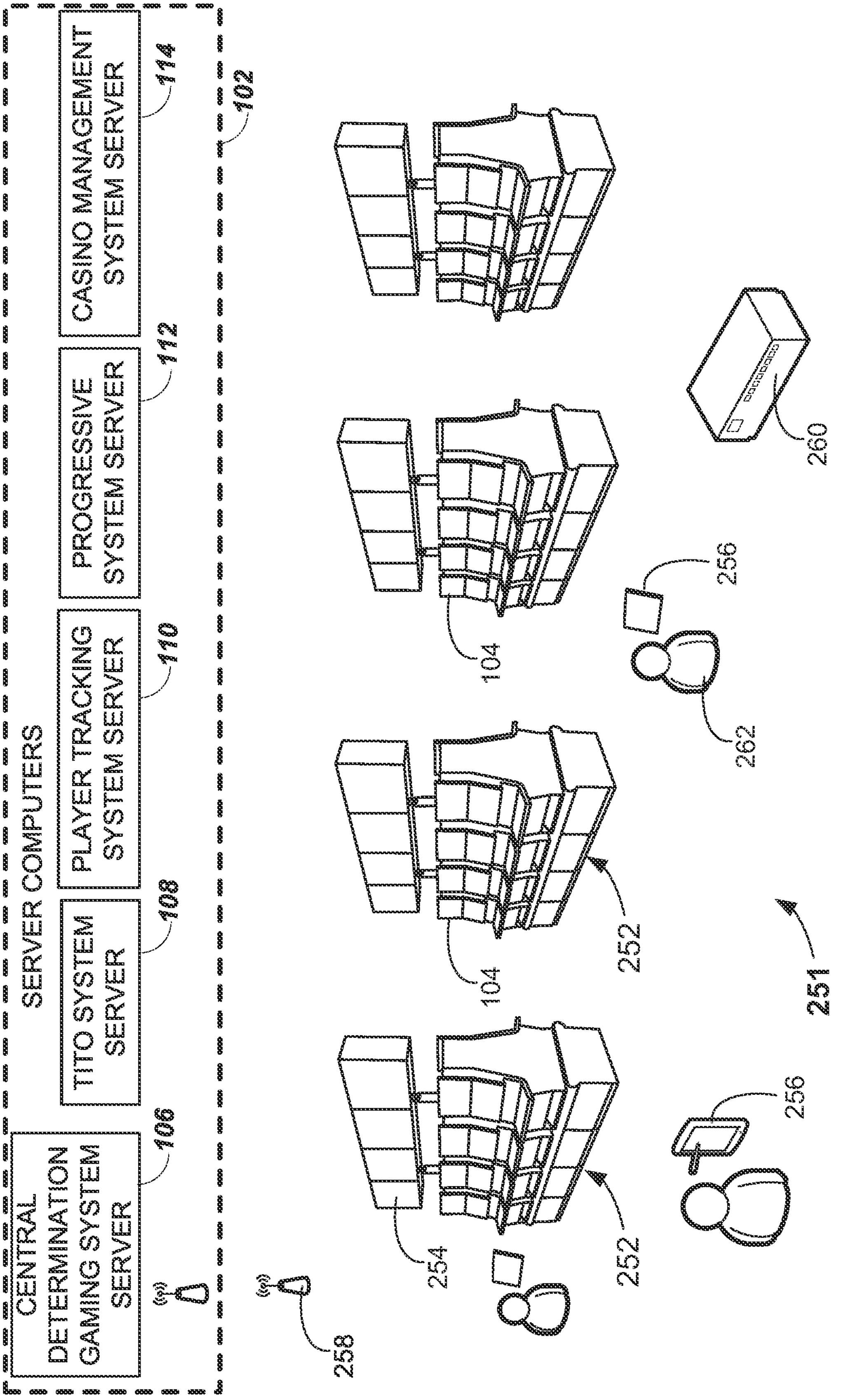
FIG. 2B depicts a casino gaming environment according to some examples.

FIG. 2B depicts a casino gaming environment according to one example. In this example, the casino 251 may include banks 252 of electronic gaming machines (EGMs) 104. In this example, each bank 252 of EGMs 104 may include a corresponding gaming signage system 254 (also shown in FIG. 2A). According to this implementation, the casino 251 may also include mobile gaming devices 256, which are also configured to present wagering games in this example. The mobile gaming devices 256 may, for example, include tablet devices, cellular phones, smart phones and/or other handheld devices. In this example, the mobile gaming devices 256 may be configured for communication with one or more other devices in the casino 251, including but not limited to one or more of the server computers 102, via wireless access points 258.

According to some examples, the mobile gaming devices 256 may be configured for stand-alone determination of game outcomes. However, in additional or alternative implementations, the mobile gaming devices 256 may be configured to receive game outcomes from another device, such as the central determination gaming system server 106, one of the gaming devices 104, and so on.

Some mobile gaming devices 256 may be configured to accept monetary credits from a credit or debit card, via a wireless interface (e.g., via a wireless payment app), tickets, a patron casino account, and so on. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash-out and/or cash-in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, a wireless interface (e.g., a wireless payment app), tickets, and so on. According to some examples, the kiosks 260 may be configured to accept monetary credits from a casino patron and may provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, and so on.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
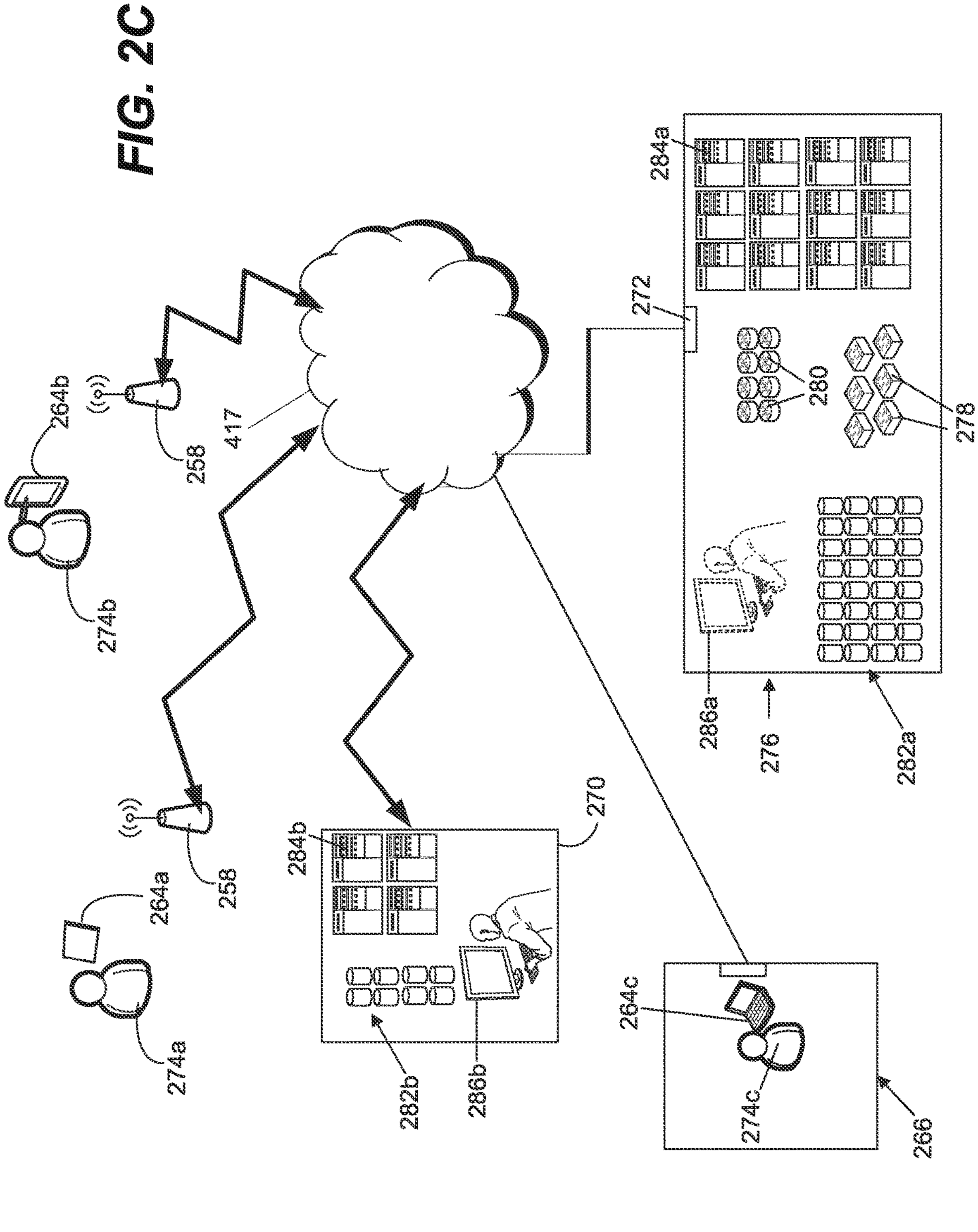
FIG. 2C is a diagram that shows examples of components of a system for providing networked/online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* may be capable of communication via one or more networks 417. The networks 417 may, for example, include one or more cellular telephone networks, the Internet, and so on. In this example, the EUDs 264*a* and 264*b* are mobile devices: where the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 may include various devices that are configured to provide online wagering games via the networks 417. The gaming data center 276 may be capable of communication with the networks 417 via the gateway 272. In this example, switches 278 and routers 280 may be configured to provide network connectivity for devices of the gaming data center 276, including storage devices 282*a*, servers 284*a*, and one or more workstations 286*a*. The servers 284*a* may, for example, be configured to provide access to a library of games for online gameplay. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 may include servers 284*b*, storage devices 282*b*, and one or more workstations 286*b*. According to this example, the financial institution data center 270 may be configured to maintain financial accounts, such as checking accounts, savings accounts, loan accounts, and so on. In some implementations, one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results, and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online gameplay, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as applications ("apps") and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3A:
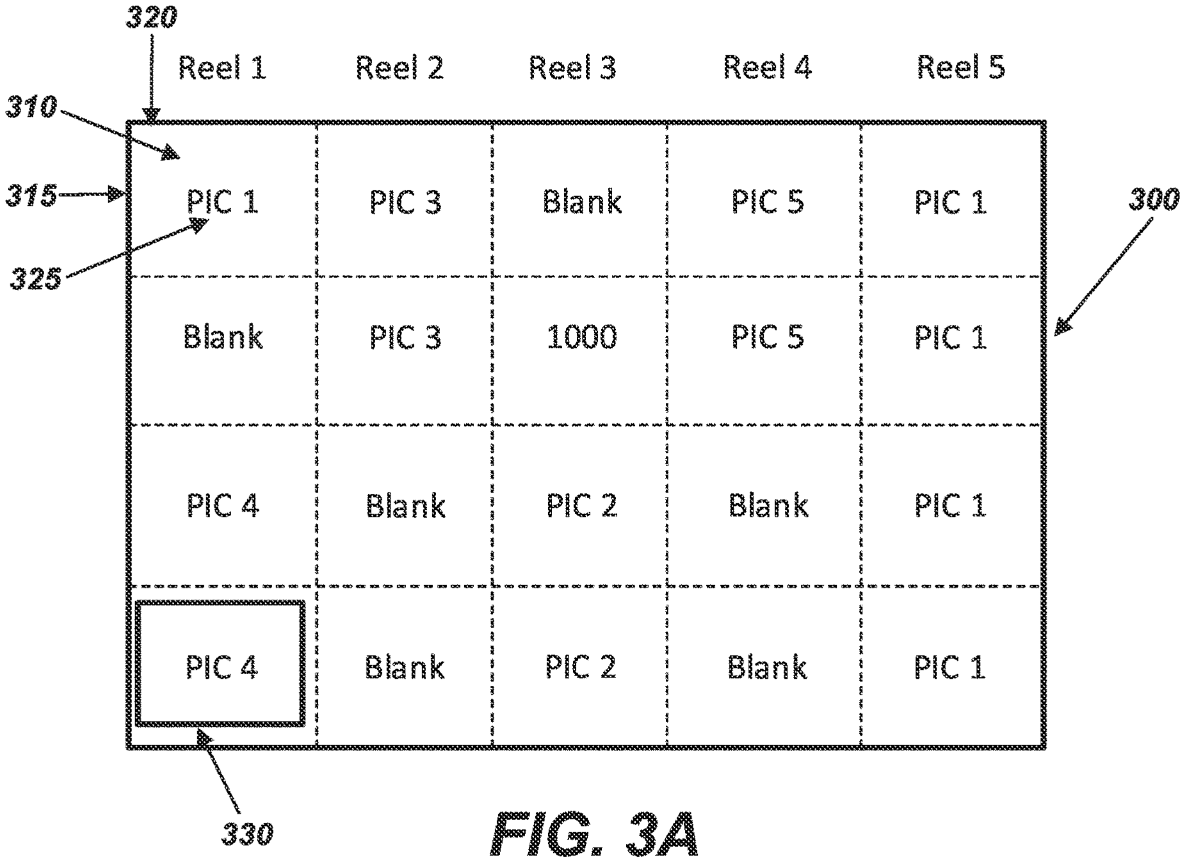
FIGS. 3A-3H depict sample playing fields and a movable selector, as may be used in games implemented by a gaming device.
Figure 3B:
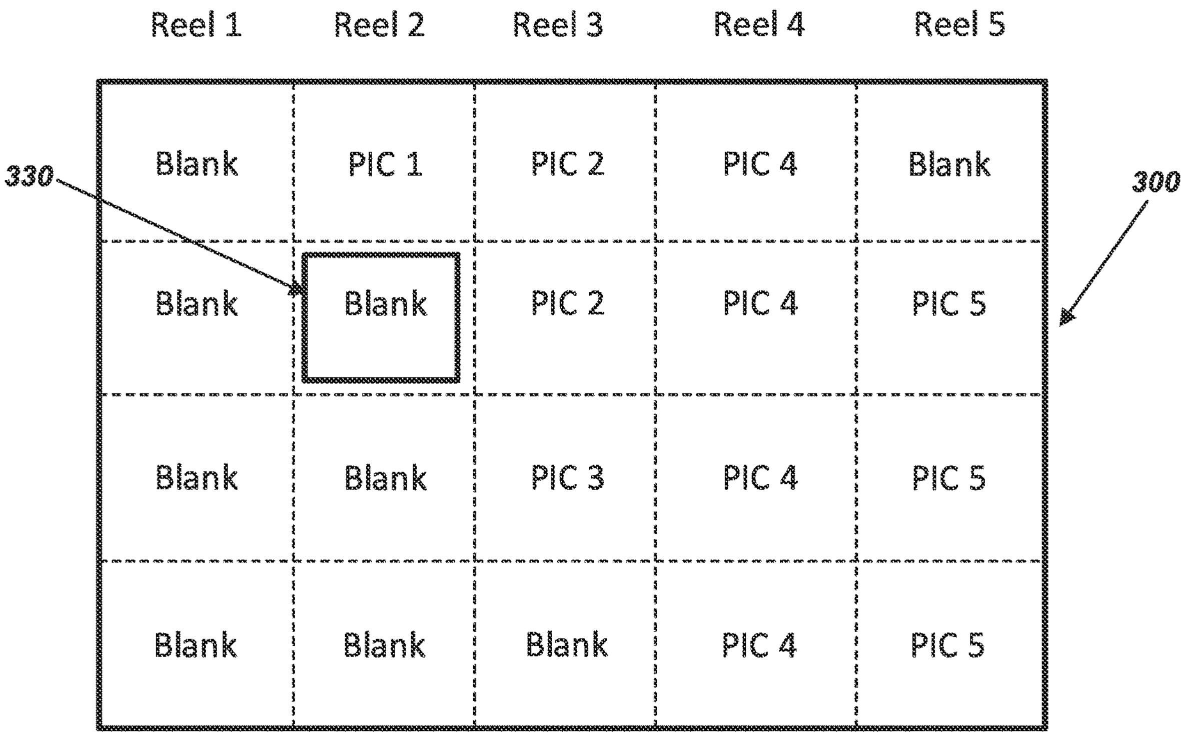
Figure 3C:
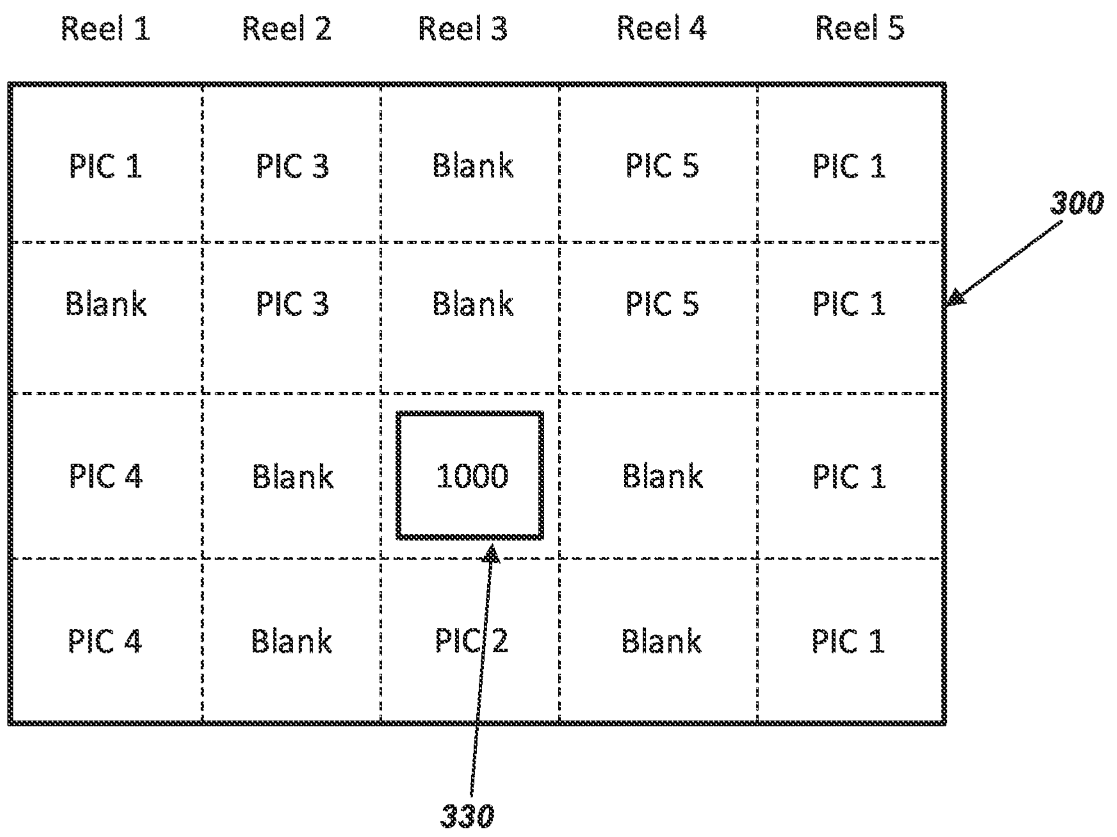
Figure 3D:
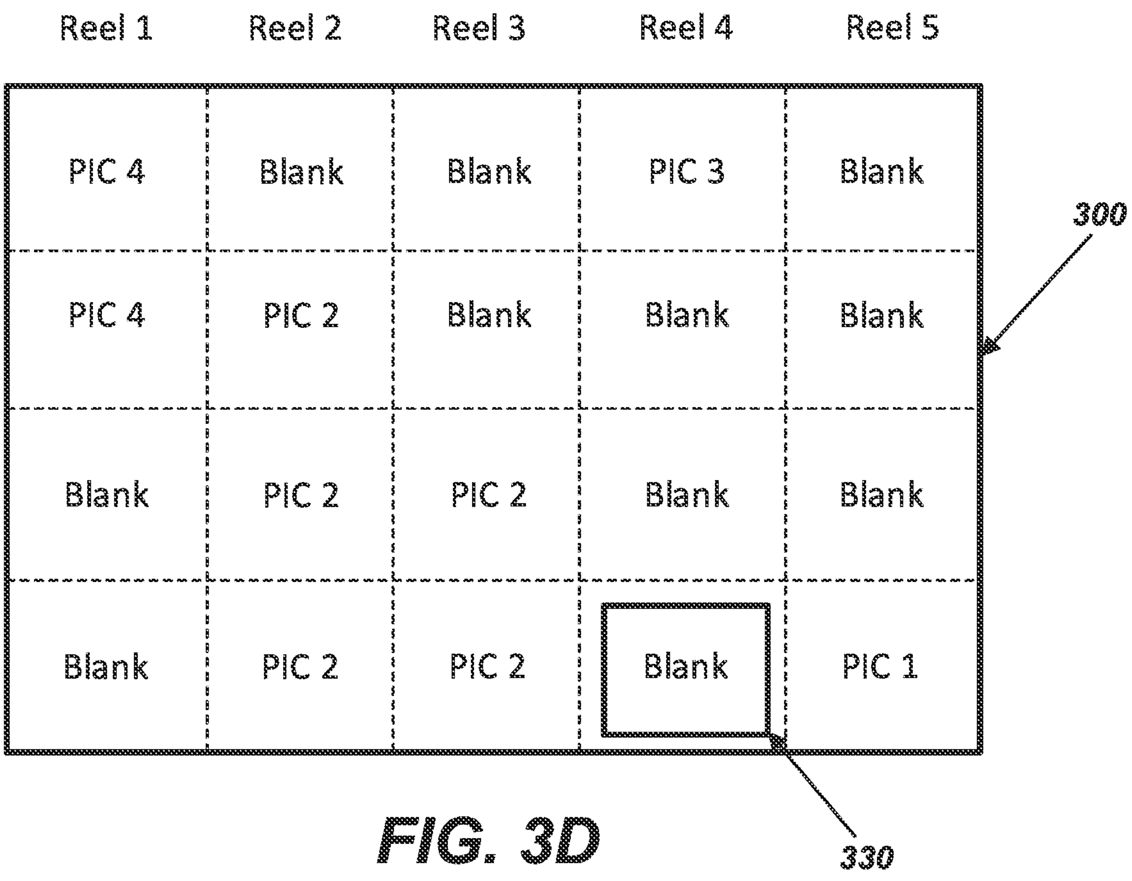
Figure 3E:
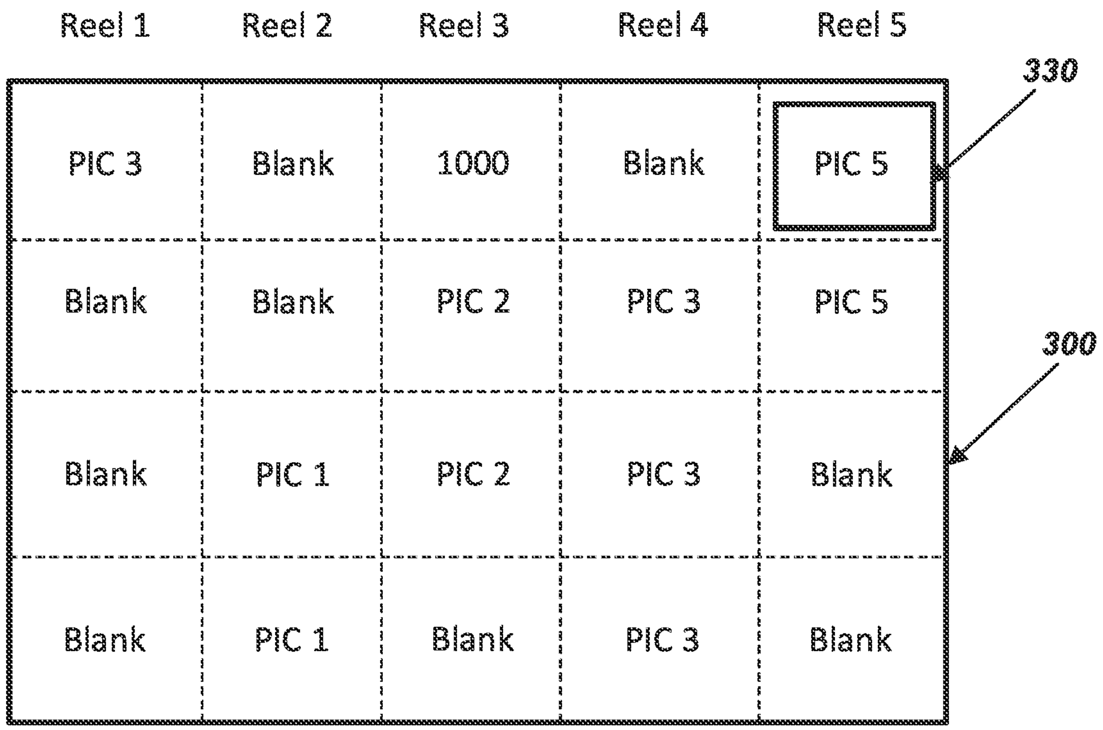
Figure 3F:
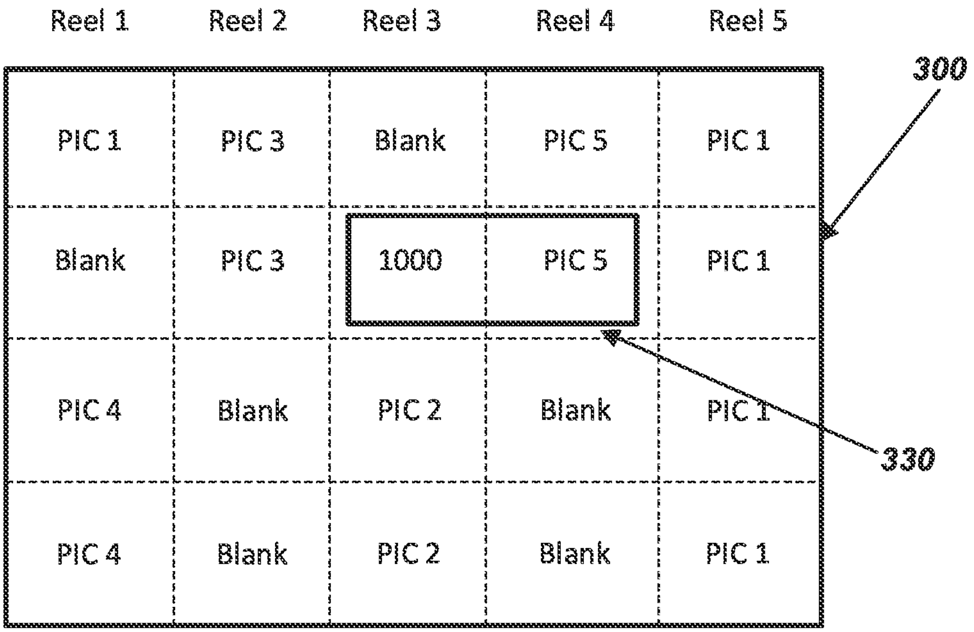
Figure 3G:
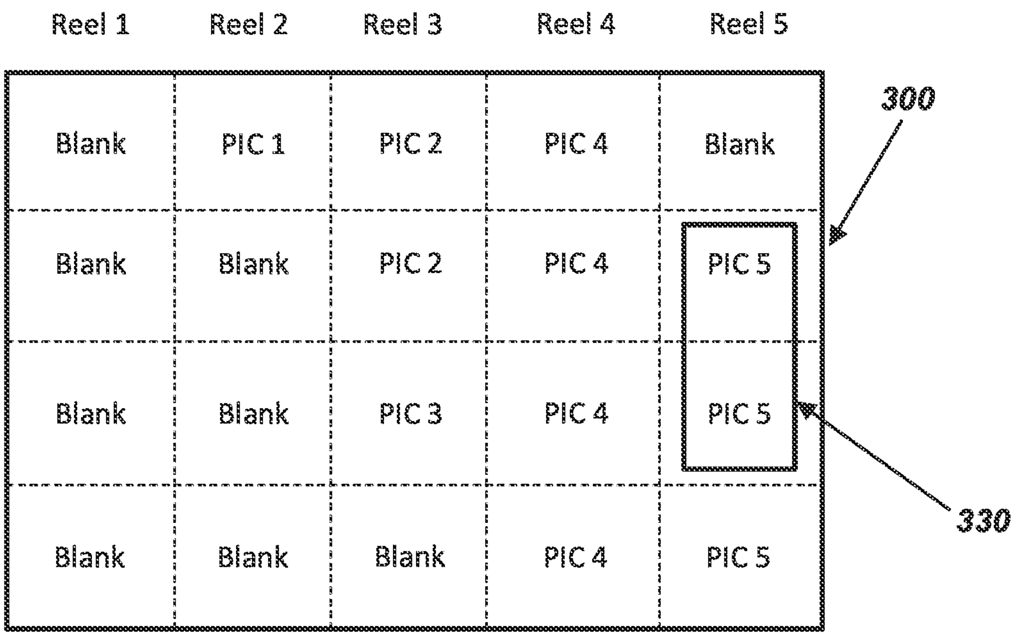
Figure 3H:
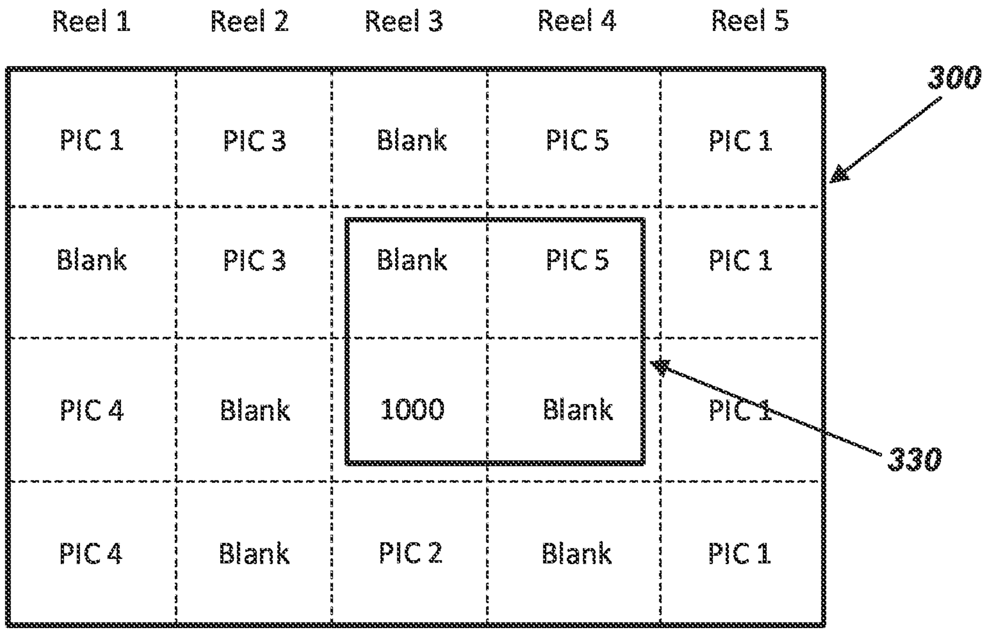

FIGS. 3A-3H generally illustrate various instances of a playing field that may be used to play a wagering game on a gaming device, and particularly showing both a number of symbols in different positions of the playing field and motion of the mobile selector. Each of FIGS. 3A-3F show different, consecutive games, such that the reels create a different set of symbols on the playing field for each game and the selector moves its position during or between each game. Thus, FIGS. 3A-3F show an example sequence of games that may be used to illustrate operation of a gaming device employing a mobile selector. FIGS. 3G-3H show operation of the gaming device during sample bonus games, as described in more detail below. Generally, the playing field is shown on a display of a gaming device and the user may wager credits or the like on an outcome of a game, namely whether a mobile selector (as described herein) encompasses, selects, or otherwise indicates a prize symbol on the playing field. The playing field is generated separately for each game; the generation of the playing field from reels or any other suitable mechanism, when combined with the motion of the mobile selector (also referred to herein simply as a "selector") not only determines if a wager is paid out to the player, but does so with controlled RTP and volatility.

As shown in FIG. 3A, the playing field 300 is formed from four rows and five columns. It should be appreciated that this is an arbitrary number of rows and columns and other embodiments may have more or fewer rows or columns, or both. Generally, each location 310 of the playing field is defined by the intersection of a row 315 and column 320. A symbol 325 occupies each location 310. The terms "position" and "location" are generally used interchangeably throughout this document.

The symbols in each position are determined by the processor 204 or other suitable processing unit, which may be external to the gaming device 104 in some embodiments. The processor 204 may determine which symbols make up the locations in a given column by selecting a portion of a virtual reel for display. The portion of the virtual reel may be determined through any suitable random algorithm including the use of RNGs 212, 244. This may be referred to as "spinning" the reel.

Generally, a reel has a fixed pattern of symbols and is of a fixed length, although the fixed pattern and/or length may vary between reels. The symbol pattern and reel length are constructed to control RTP and/or volatility across a sufficiently large number of spins. To that end, certain symbols may be grouped together or other orders of symbols may be chosen to form the fixed symbol pattern. Given the fixed symbol pattern, the placement of symbols on a reel with respect to one another does not change between games. Each column may have a dedicated reel, reels may be shared between columns, each column may have a set of reels from which a single reel is chosen per game or per set of games (in which case the placement of symbols on a reel with respect to one another may change between games), each position may have its own reel or set of reels, and so on, in order to vary the composition of the playing field 300 from game to game and increase player engagement, as described above. Further, while reels are generally described with respect to, and associated with, columns of the playing field, they may be associated with rows instead.

FIG. 3A shows, for example, that the leftmost column corresponds to a first reel, the next column corresponds to a second reel, and so on to the fifth column, which corresponds to a fifth reel. In the playing field 300 shown in FIG. 3A, the processor 204 has chosen to display (from top to bottom) PIC 1, Blank, PIC 4, and PIC 4 of the first reel. By randomly selecting a four-symbol portion of each of the first through fifth reels, the processor 204 constructs the playing field 300 which is, in turn, displayed to the player on the display 128 of the gaming device 104.

Additionally, the processor 204 may select a position in which a mobile selector 330 appears as the reels stop spinning and the playing field 300 is fixed on the display 128. In FIG. 3A, the selector 330 occupies the position where row 4 intersects column 1 (e.g., the lower left corner of the playing field). The selector may be animated to smoothly move between positions, may jump from position to position before settling on its final position, may stretch, warp, or deform to change positions, and so on. Generally, the selector changes position with each game, although it is possible in some embodiments that the selector's updated position is randomly determined to be the same as in the previous game.

Still with respect to FIG. 3A, the selector encompasses or otherwise highlights the symbol in its position; here, that symbol is PIC 4. As the selector encompasses a winning symbol the player is paid a value corresponding to the PIC 4 symbol. Had the selector encompassed a blank symbol, the gaming device 104 would not have paid the player.

As the selector moves randomly or pseudo-randomly within the playing field between or during a game, its position varies from game to game. If a symbol is within or encompassed by the selector then the player is paid a corresponding value; if a blank symbol is within or encompassed by the selector, the player receives no payment for that game. Thus, in gaming devices 104 using a mobile selector 330 with a playing field 300 determined by spinning reels, payouts are not determined by matching symbols as in conventional gaming devices. This provides an exciting and unusual experience for the player.

Further, gaming devices 104 employing both reels and mobile selector(s) to determine payouts incorporate at least two, and optionally three, distinct and separate random elements in their gameplay—the portion of the reels displayed to create the playing field 300, the ultimate position of the selector 330 on the playing field, and, in some embodiments, a size of the selector (e.g., a number of positions encompassed by the selector). The interaction of both random elements creates a more complex gaming experience for the player and also a more complex system through which volatility and RTP may be controlled. Put another way, there are two factors used by the gaming device to control volatility and RTP—the reels and the mobile selector—rather than just one, as is the case in many conventional gaming devices.

In some embodiments the selector 330 may move randomly, while in others the selector 330 may move pseudo-randomly. As one example of pseudo-random movement, with each new game a selector may iterate from left to right across or along columns while moving randomly between rows. This may happen simultaneously (e.g., the selector changes row and column location at the same time) or sequentially (e.g., the selector changes its column before a spin or while reels are spinning, and then changes the row while reels are spinning), and may appear to change position randomly or according to a pattern (for example, the selector may move between columns and/or rows, including back and forth, before ultimately settling on a predetermined column and random row). In some embodiments, iterating column location while randomizing row location of the selector maintains a random element of the game while reducing motion of the selector, which may help reduce player disorientation. Further, and as illustrated in FIG. 3B when compared to FIG. 3A, certain components of the selector's motion may be random while others are fixed. FIG. 3B generally shows a playing field during a second of a series of games, where FIG. 3A showed the first game in the series. A "series" of games may be a set of consecutive games played by a player without cashing out his or her wagers, without indicating that a player has changed (for example, by changing loyalty information received by the gaming device 104), or otherwise by a single player.

As shown in FIG. 3B, the mobile selector 330 is now in, on, or otherwise indicating the position defined by an intersection of the second column and second row. In some implementations, with each consecutive game in a series the mobile selector may move by one column while the row is randomly selected, thereby incrementing through the columns. This is referred to herein as "pseudo-random movement," insofar as one component of the selector's movement is fixed and one component is randomly determined. The fixed movement component need not be a one-column change and the random movement component may be determined through use of a lookup table, algorithm, random generator function, and so on. Pseudo-random movement of a selector 330 may reduce dizziness, fatigue, nausea, or other unpleasant side effects experienced by a player as compared to a gaming device employing a selector with fully random movement, insofar as the selector's movement may be less abrupt and/or less visually discontinuous.

In implementations employing pseudo-random movement for the selector 330, the fixed movement component may be moving by one column, from left to right, until the last column of a playing field is reached. At that point, the fixed movement component may return the selector 330 to a first column of the playing field or, alternatively, may move the selector from right to left. It should be appreciated that these are but examples of a fixed movement component in a pseudo-random movement; gaming devices 104 may utilize different fixed movement components, including: incrementing through rows instead of columns (in which case the movement with respect to columns may be random); alternating fixed movement between rows and columns; skipping certain rows or columns; moving by more than one row or column; and so on. In some embodiments the fixed component may be a relatively long pattern designed to provide the appearance of randomness.

Still with respect to FIG. 3B, the mobile selector 330 now encompasses a blank symbol and so no payout is made to the player. The term "blank symbol" includes any non-winning symbol and does not necessarily require that no symbol or a non-visible symbol (e.g., a blank) be shown in a position of the playing field.

In accordance with the example pseudo-random motion described above, FIG. 3C depicts a third game in a series. In the example of FIG. 3C, the selector 330 has moved within the playing field 300 according to its fixed movement component (e.g., from column 2, as shown in FIG. 3B to column 3) and according to its random movement component (e.g., to a row that is randomly determined by the processor 204). Further, in the example shown in FIG. 3C, the mobile selector 330 encompasses a bonus symbol 335; here, the bonus symbol is "1000," which may represent a number of credits or other items of value that the player wins. Some bonus symbols may represent a payout amount, as in this example, while others award and/or increment a jackpot, still others initiate bonus games or other additional functionality of the gaming device 104, and yet others may trigger multiple functions when the selector 330 lands on them, encompasses them, or the like.

FIGS. 3D and 3E illustrate playing fields 300 for fourth and fifth games in a series, respectively. As shown in these figures the mobile selector 330 continues its pseudo-random movement, incrementing to the next column while randomly moving to a given row.

In some embodiments, the mobile selector 300 may change its size, encompassing more than a single position of a playing field 300. This may occur for a number of circumstances. For example, a size of the selector 300 may be different during a bonus game (e.g., games resulting from winning additional plays during a standard game) than in a standard game. As another option, a game may display a pick-your-volatility screen or user interface that includes multiple game volatility options. For example, the game may provide four different game volatility options at the pick-your-volatility screen. At the pick-your-volatility interface, a player may elect to change a size of the mobile selector 300 in order to change a volatility of the game; in some implementations, a payout or prize multiplier associated with the selector, payout amount for prize symbols, playing field size (e.g. rectangular matrix size), and/or the number of spins allocated for a feature (e.g., free games in a bonus game) may change in response to the player changing a size of the mobile selector 300. This may permit control of RTP while increasing volatility. In accordance with regulation requirements, each game volatility option would be set to have approximately the same RTP. Otherwise, if the game volatility options differed in RTP, regulation would require the game to disclose the game volatility option with the highest RTP. Further, some gaming devices 104 may allow the player to change the selector size during standard and bonus games, while others may permit the player to change the selector size only during bonus games (or, conversely, only during standard games). Additionally, in some implementations, bonus games may use purely random movement instead of pseudo-random movement to move the selector 300 to a position within the playing field 300. In some embodiments, a size of the mobile selector may change randomly between games or from game to game. Further, in some embodiments, a player may choose a position for the selector, may indicate when a selector is to stop moving (which may result in the selection of an end position by a user or may result in the specification of a region of multiple possible end positions by a user, the actual end position being determined within the region by the gaming device), a multiplier associated with the mobile selector (such that certain or any symbols within the mobile selector at the end of a game are multiplied or enhanced by the multiplier value), or may do two or more of these things.

FIGS. 3F-3H depict different instances of a bonus game showing selectors 330 of different sizes. For example and as shown in FIG. 3F, the selector may be a 1×2 selector 330 and encompass two positions on a single row of a playing field 300. As another option, the selector may be a 2×1 selector 300 as shown in FIG. 3G, encompassing two positions on a single column of a playing field 300. The selector need not be limited to encompassing positions on a single row or single column, as generally illustrated by the selector 300 of FIG. 3H.

Generally, when the selector encompasses multiple positions, the values of any prize symbols or bonus symbols within those multiple positions are summed and awarded to the player. In the example shown in FIG. 3H, the player would win (1000+(PIC 5 value)) in credits or the like, while in the example of FIG. 3G, the player would win 2×(PIC 5 value) in credits. Similarly, if a bonus game/free spin symbol, jackpot award and/or increment symbol, or the like (collectively, a "bonus symbol") is encompassed by the selector 330 along with a prize symbol, the player wins the value of the prize symbol and the bonuses corresponding to the bonus symbol. In some embodiments, the size of the selector 300 may randomly vary from game to game, may vary according to an algorithm, may grow to ensure at least one prize symbol or bonus symbol is encompassed, and so on. The size of the selector may change from standard game to standard game, standard game to bonus game, and/or bonus game to bonus game.

Figure 3I:
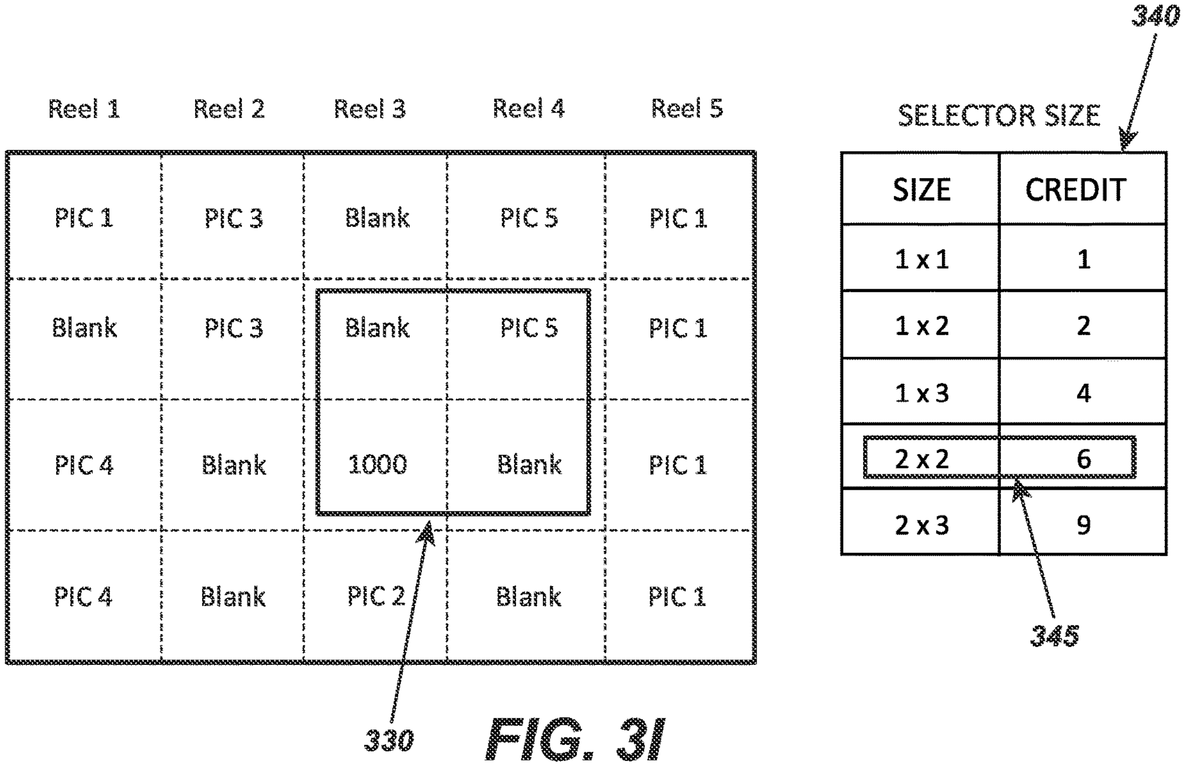
FIG. 3I illustrates another sample embodiment similar to that of FIGS. 3A-3H, but including an interface through which a player may select a size of the mobile selector for a current or next game.

FIG. 3I illustrates another sample embodiment similar to that of FIGS. 3A-3H, but including an interface 340 through which a player may select a size of the mobile selector 330 for a current or next game. As indicated by both the size of the selector 330 and the selector size indicator 345, the player has selected a 2×2 size for the mobile selector. By varying a size of the mobile selector 330, a player may adjust a number of positions encompassed by the mobile selector, which in turn affects a potential payout of the gaming device and its volatility. Generally, as the mobile selector 330 increases in size, the potential payout (e.g., RTP) of the gaming device per game increases as does its volatility.

In some embodiments, the change in RTP and/or volatility may be linear as the size of the mobile selector 330 increases while in others it may be non-linear. Further, a gaming device may increase a number of credits used per game as the size of the mobile selector increases in order to offset the corresponding increase in RTP and/or volatility. This is shown in FIG. 3I, where the interface 340 has two columns, namely a first column indicating a size of the mobile selector and a second column indicating a number of credits charged for the corresponding selector size.

As shown in this figure, it is not necessary to linearly increase a number of credits as a size of the mobile selector 330 increases (as chosen by the player). Although some embodiments may set or utilize a linear relationship between the two, other embodiments may increase a number of credits more or less rapidly than the change in the number of positions encompassed by a mobile selector 330 of a given size. Here, for example, a 1×1 mobile selector 330 costs a single credit for a player to select and encompasses a single position of the playing field 300. By contrast, a 1×3 selector 330 encompasses three positions and costs four credits, a 2×2 selector 330 encompasses four positions and costs six credits, and a 2×3 selector encompasses six positions and costs ten credits. Thus, it can be seen that some embodiments charge more credits per position encompassed as the mobile selector 330 grows in size. To illustrate, the 1×1 selector costs a single credit per position encompassed (as does the 1×2 selector), the 1×3 selector costs 1.33 credits per position encompassed, the 2×2 selector costs 1.5 credits per position encompassed, and the 2×3 selector costs 1.67 credits per position encompassed. It should be appreciated that both the mobile selector 330 sizes and the number of credits shown in the interface 340 are illustrative rather than limiting. Embodiments may permit a user to choose a mobile selector 330 of sizes other than those illustrated in FIG. 3I and may charge any suitable number of credits for such sizes.

Figure 3J:
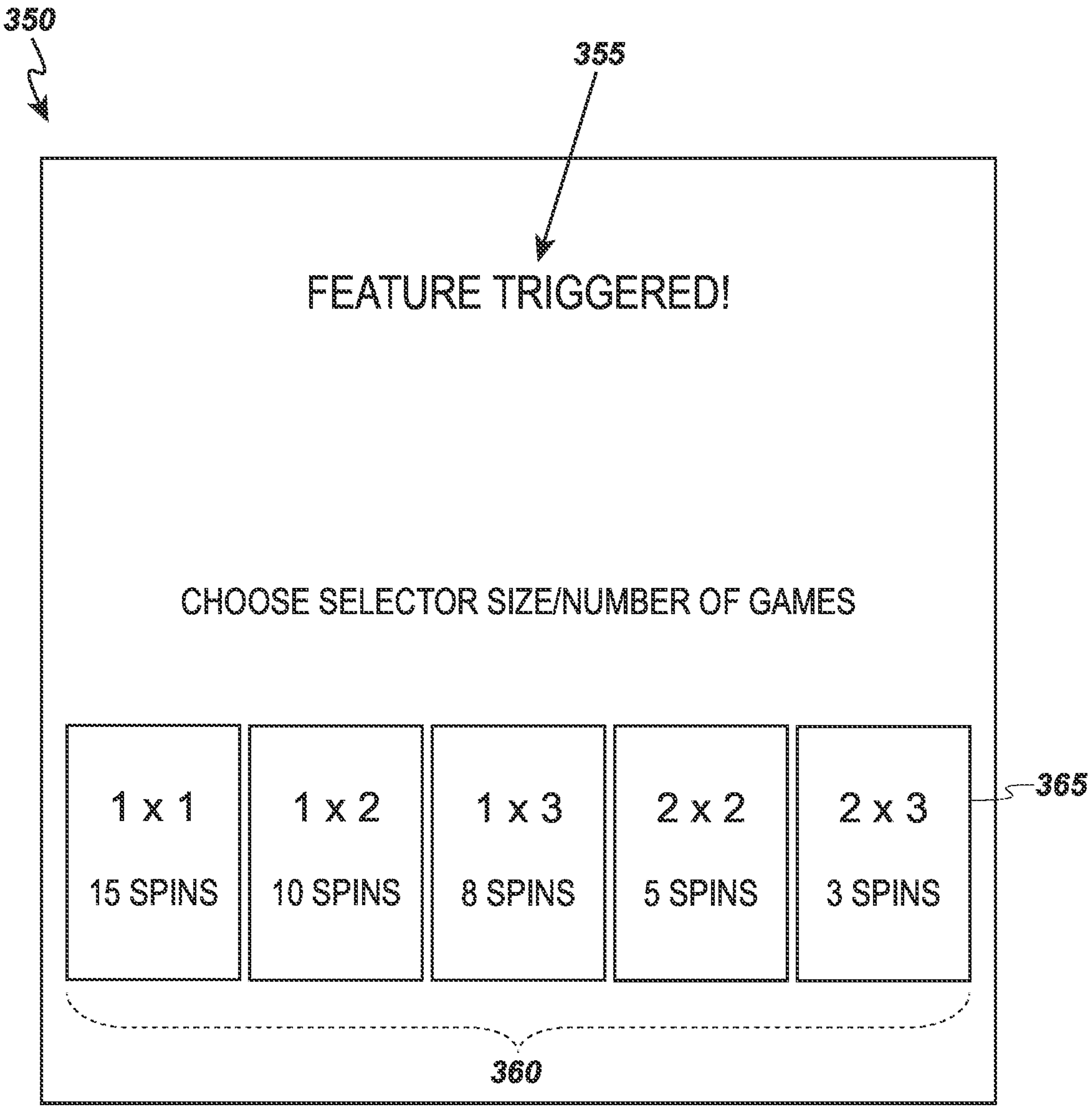
FIG. 3J illustrates a sample screen of a gaming device, showing an interface through which a player may select a combination of mobile selector size and a number of games.

Similarly, FIG. 3J illustrates a display of a gaming device, showing a user interface 350 that permits a player to select a combination of mobile selector size and a corresponding number of games. The user interface 350 may be shown in response to a particular feature of a game triggering, which typically occurs when a particular symbol or symbols are encompassed by a mobile selector. As one non-limiting example, the user interface may trigger in response to a mobile selector encompassing a symbol that awards bonus spins/free games. As another non-limiting example, the user interface may trigger in response to a mobile selector encompassing a special symbol associated with the user interface.

Still with reference to FIG. 3J, the user interface 350 includes a message 355 indicating that the feature has triggered, along with a row or set 360 of selection elements 365. Each of the selection elements 365 in the set 360 corresponds to a different combination of mobile selector size (e.g., 1×1, 1×2, 1×3, and so on) and number of bonus spins (e.g., 15, 10, 8, and so on). The player may select the selection element 365 of his or her choice and is awarded a number of bonus spins indicated in the selection element 365. Further, during these bonus spins, a size of the mobile selector is the size specified in the selection element 365.

Generally, as a selector size increases a number of bonus spins decreases, as shown in the user interface 350 of FIG. 3J. By awarding more spins if a smaller mobile selector size is chosen or, conversely, fewer spins if a larger mobile selector size is chosen, an RTP may be held constant (subject to inherent randomness of each spin) for the group of bonus spins. More specifically, RTP increases as the mobile selector size increases. Accordingly, for any single spin, the RTP is greater if the mobile selector size is larger. To counteract this, fewer bonus spins are provided for large mobile selector sizes. The exact number of bonus spins and mobile selector sizes that are provided in each of the selection elements 365 may vary from game to game in accordance with the mathematics and/or target RTP of the particular game.

Although the overall target RTP of each pairing of bonus spins and sizes is the same for each selection element 365, a volatility for each pairing may vary greatly. Typically, the more bonus spins chosen by a player through the user interface 350, the lower the volatility. By contrast, choosing a smaller number of bonus spins paired with a larger mobile selector size yields a higher volatility. In this manner a player may select a desired volatility for the bonus spins through the user interface 350.

Certain embodiments may add a multiplier to the combinations of mobile selector size and number of bonus spins in each selector element, as well. Some embodiments may vary a multiplier instead of a number of bonus spins as yet another alternative; in these embodiments larger mobile selector sizes are generally paired with lower multipliers in order to hold expected RTP constant across the combinations set out in each of the selector elements 365. Additionally, it should be appreciated that the specific combinations of mobile selector size and number of bonus spins shown are illustrative of the general principle set out herein rather than a specific combination used by any particular embodiment.

Although FIGS. 3F-3I illustrate bonus games with playing fields 300 having the same dimensions (e.g., number of reels and columns) as the standard games shown in FIGS. 3A-3E, this need not be the case. The playing field 300 for a bonus game may vary in height, width, or both as compared to the playing field of a standard game. As one non-limiting example, an additional row may be added to the playing field 300 of a bonus game as compared to a standard game, thus generating more excitement and interest for player, as well as providing an opportunity for the selector 300 to move to positions not present in a standard game. Similarly, the playing field may change size from one standard game to another; it is not necessary that such changes in playing field 300 occur only when bonus games are played.

As mentioned previously, symbols in positions encompassed by a selector generally are paid to a user, whether as credits or bonuses. Prize symbol values may be determined by any of: a pay table where each prize symbol has a set value; a graduated pay table where each symbol's value varies with a total number of prize symbols in the playing field; a varying value in accordance with a number of credits wagered; a value that varies with a jackpot value; and so on. Bonus symbols have previously been discussed, but may include symbols that award free games, increment and/or award a jackpot, trigger additional features of a game or gaming device, and so on. Further, some symbols may be both prize symbols and bonus symbols. In some embodiments, jackpots maintain their incremented value from game to game.

Figure 4:
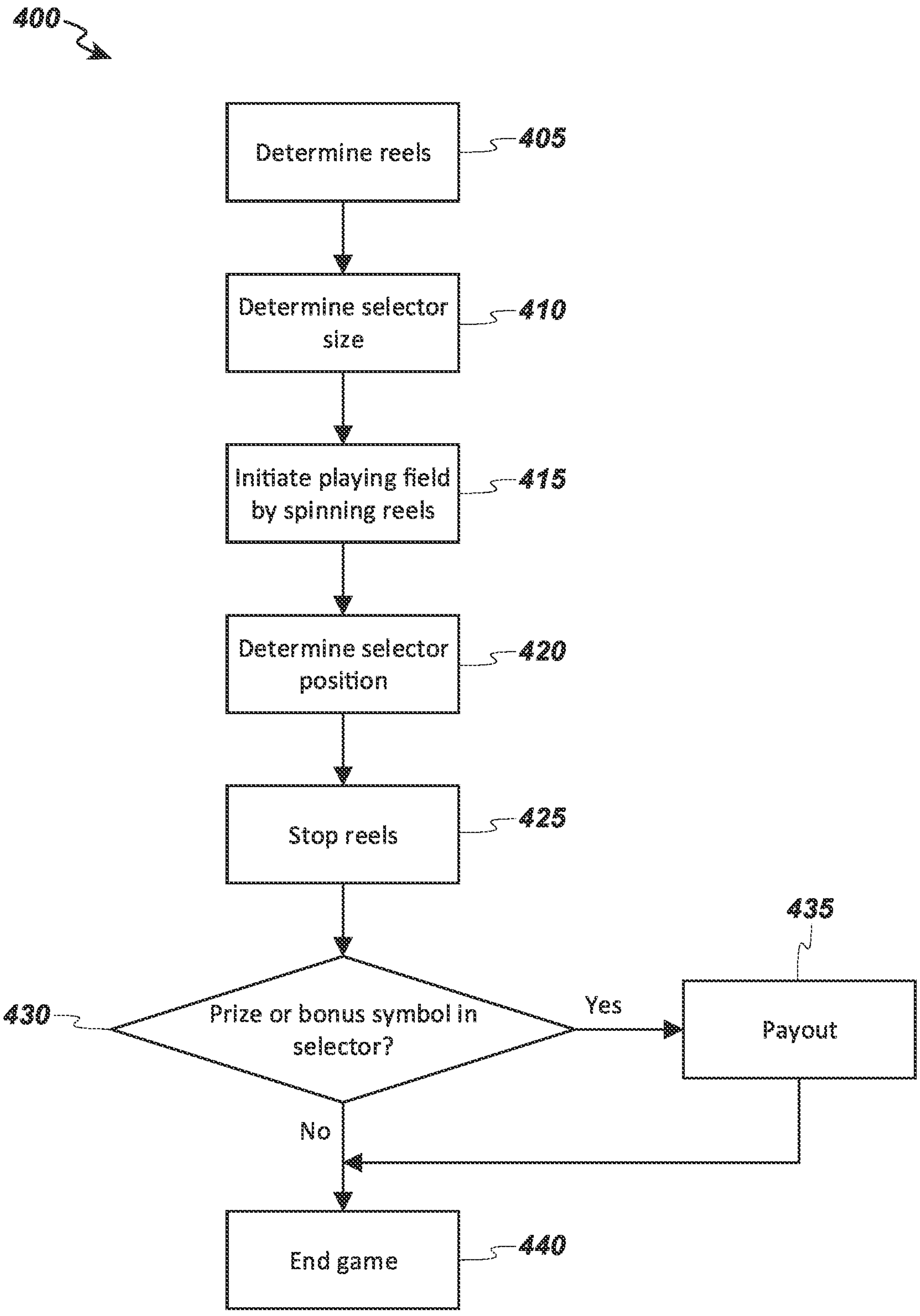
FIG. 4 is a sample flowchart showing operations for implementing a game having a playing field and a movable selector configured to randomly or pseudo-randomly move within the playing field to determine the outcome of a game.

FIG. 4 is a sample flowchart 400 showing an example method for establishing a playing field and using a mobile selector to determine a win or loss by a player, as may be executed by a gaming device described herein. Generally, the flowchart 400 illustrates a set of operations that may result in any of the playing fields shown in FIGS. 3A-3H. Additionally, it should be noted that many of the operations of the flowchart 400 may be performed in orders other than as shown. For example, operations 405 and 410 may be performed in any order, as may operations 4015 and 420. Likewise, operation 415 may occur before operation 415, as may operation 420. Further, although multiple operations are discussed as being executed or determined by "a processor" or "the processor," there is no requirement that each operation be performed by the same processor.

In operation 405, a processor of a gaming device may determine a set of reels to be used to construct a playing field. In some embodiments, this operation may be omitted. Certain embodiments determine the set of reels to be used by randomly assigning a reel from a set of reels to each column of a playing field. Unique reels may be assigned to each column, the same reel to all columns, the same reel to multiple columns with other columns being assigned different reels (or a different reel), and so on. For example, a subset of reels may be randomly chosen from a set of reels, where the number of reels in the subset equals the number of columns in the playing field. Each of the subset of reels may be randomly assigned to a unique column. In other embodiments, reels may be assigned to individual positions rather than to columns, to rows instead of columns, and so on. In any of these embodiments, the reels may be randomly selected for assignment and randomly assigned to a column, row, or position.

In operation 410, a selector size is determined by the processor or a player. Some embodiments may omit this operation and may utilize a fixed-size selector. The size of the mobile selector may be determined by a processor of the gaming device or by a player. In embodiments where the processor determines the mobile selector size, the processor may utilize a lookup table to determine the size or may utilize an algorithm. The lookup table typically has a number of entries, each with a corresponding weight or probability of being used to determine the mobile selector size. The weights of the lookup table entries are predetermined such that, across a sufficient number of games, a size of the mobile selector converges on a predetermined size. In embodiments utilizing an algorithm rather than a lookup table, the algorithm may be configured to generate a similarly weighted set of outcomes or a single outcome in accordance with a probabilistic distribution of outcomes that generally operates in a manner similar to the aforementioned lookup table.

In operation 415, a playing field is initiated by “spinning” the reels and selecting a group of symbols from each reel to be displayed in positions of the playing field. Generally, a set of M symbols is selected to construct a single column of the playing field, where M is the number of rows in the playing field.

In operation 420, the processor determines a selector position for the mobile selector. As previously discussed, this position may be determined randomly or pseudo-randomly. If the selector size is more than 1×1, it may occupy or encompass multiple adjacent positions.

As previously mentioned, gaming devices employing a mobile selector must account for the motion of the selector and its random elements when determining a player payout. Put another way, the inherent unpredictability of the mobile selector’s motion (whether random or pseudo-random) introduces another variable that must be accounted for when determining volatility and RTP of the device. Broadly, the RTP and volatility of a game executing on the gaming device is generally based on three factors: 1) a symbol density of each reel strip; 2) a size of a mobile selector (e.g., how many symbols the selector encompasses); and 3) motion of the mobile selector. It should be noted, however, that the mobile selector’s motion does not affect RTP for a given play if each of the reels are identical, or at least have the same distribution of symbols that result in a payout. In such an embodiment, though, gameplay is fairly predictable.

To avoid predictable outcomes, different reel strips may be used for different columns of the playing field, as mentioned above. However, the use of different reel strips in a gaming device causes RTP and volatility to vary as the mobile selector moves from column to column of the playing field.

In certain embodiments, the payout of the gaming device varies with the symbol density of the reels. For example, any given reel may have blank (non-paying or inactive) symbols in certain positions and paying or active symbols in other positions. As the ratio of active to inactive symbols (e.g., density) increases, so too does the probability that the mobile selector encompasses an active symbol and thus that a user is paid for any given game. Thus, increases in symbol density for a reel or set of reels increases volatility and return to player for the gaming device.

Likewise, in certain embodiments the payout of the gaming device may vary with a size of the mobile selector. For example, the size of the mobile selector may vary from spin to spin of the gaming device. The size of the gaming device may be determined by using a lookup table or algorithm. The lookup table may have multiple entries, each of which corresponds to a different size of the mobile selector and each of which has a different weight or probability. Higher-weighted entries are more likely to be used to set the mobile selector size while lower-weighted entries are less likely to be used. As the size of the mobile selector increases, the RTP and/or volatility likewise increase. By using a weighted lookup table or an algorithm that generates a similarly weighted set of outcomes to determine the size of the mobile selector, average RTP and/or volatility across a sufficiently large series of games will converge to a given or predetermined value.

In operation 425, the reels are stopped and the symbols are displayed on the playing field, as shown on a display of the gaming device.

In operation 430, the processor determines if a prize symbol or bonus symbol is within the selector. If so, then in operation 435 the gaming device pays out the player accordingly; this payout may be credits, free games, jackpot increments, jackpot awards, and so on. Different embodiments may use different methodologies to determine a payout of the game. In embodiments employing a single mobile selector, multiple pay operations may be performed to determine the final payout amount. For example, where a mobile selector encompasses multiple paying symbols, the symbols may be processed separately (such as left to right and/or top to bottom) to determine a payout. As another example, symbols within the mobile selector may be aggregated to determine a payout. As yet another example, matching symbols encompassed by a mobile selector may be treated as though the mobile selector encompasses only a single such symbol, again providing a different payout than other embodiments. Because the mobile selector size may change and the mobile selector moves randomly or pseudo-randomly, the payout may be very different from a conventional gaming device that utilizes fixed pay lines or in which all wins pay.

As yet another example, a gaming device may use a pay table for standard symbols encompassed by a mobile selector mobile selector. Additionally or alternatively, graduated pay tables may be used based on the total number of symbols in the active area. Additionally or alternatively, the gaming device may pay out based on credit values shown by, or assigned to, each symbol encompassed by the mobile selector. Any or all of these may be used with any or all embodiments discussed herein, including those outlined in the prior paragraph.

If no prize symbol or bonus symbol is encompassed by the selector, then the method 400 terminates at end state 440 and the game ends. Likewise, after any payout in operation 435, the game ends in end state 440. Subsequent games may be played, in which case the method 400 generally begins again.

The operations of FIG. 4 may be executed locally by a gaming device (for example, by a processor of a gaming device) or remotely by one or more servers connected to the gaming device (for example, by a processor of such a server), where the gaming device receives and transmits data to the server. In the server-execution embodiment, one server may be connected to multiple gaming devices through any suitable network, whether wired or wireless. Additionally, some embodiments may split execution of the operations between a server and local gaming device. Accordingly, references herein to the execution of an operation or use of a processor should be understood to include both local execution or operation at or by the gaming device as well as remote execution or operation by a server or other computing device networked to the gaming device.

Multiple embodiments with different functionality and features have been described above. The functions and/or features of any embodiment described herein may be combined with that of any other embodiment described herein. Further, additional functionality/features may be present in certain embodiments.

As one non-limiting example, certain embodiments may employ multiple mobile selectors on a single playing field. The mobile selectors may each move randomly, pseudo-randomly, or in a fixed pattern, and in some embodiments a first mobile selector may move randomly or pseudo-randomly while another moves according to a fixed pattern. Other embodiments may employ a static (e.g., unmoving) selector and a mobile selector. In such embodiments the static selector may be set either initially or for each game by a player or may be fixed for one or more games. The static selector may change position after a series of games, as well.

Certain embodiments utilizing multiple selectors (whether static or mobile) may allow the selectors to overlap either partially or fully, while others may not allow any overlap. When selectors overlap, any symbol in an overlapping position may be executed (e.g., paid, incremented, changed, or the like) twice or may only be executed once, depending on the logic of the particular gaming device.

Certain embodiments permit a player to select game parameters which, in turn, raise or lower volatility. In one example embodiment, a player may choose a size of the mobile selector and thus how many positions the mobile selector encompasses. As the size of the mobile selector increases, so too does volatility. Another example embodiment may permit a player to choose a number of selectors that are active during a game or series of games. As the number of selectors increases, volatility increases. With respect to yet another example embodiment, a player may choose to increase a number of games played for a given amount of credits, which may likewise increase volatility while optionally lowering a return to the player on any single game. Further, any or all of these options may be combined in an embodiment. As one non-limiting example, for a given number of credits a player may play a series of games that utilizes a mobile selector of a first size (for example, covering a single position of a playing field) or may play a single game utilizing a mobile selector of a second, larger size (for example, covering multiple positions of a playing field). In this way, a gaming device may provide different volatility options to a player and permit the player to choose their experience.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of particular embodiments are presented for purposes of illustration and example. They are not meant to be exhaustive or to limit the embodiments to the precise forms disclosed. It will be apparent to one of ordinary skill in the art that many modifications and variations are possible in view of the above teachings.

What is claimed is:

1. A system, comprising:
- a memory storing instructions; and
- at least one processor; wherein the at least one processor is operative to execute the instructions to:
- randomly assign, from a set of reels, a subset of reels to a set of columns of a playing field using a random number generator (RNG), such that each of the subset of reels corresponds to a column of the set of columns and that return to player or volatility converges to a value across a series of games even though a mobile selector moves randomly or pseudo-randomly;
- generate the playing field by randomly, via the RNG, determining a set of symbols for each column from the corresponding reel, each of the set of symbols occupying a position on the playing field;
- cause a display device to graphically render the playing field in a graphical user interface (GUI) displayed by the display device;
- randomly, using the RNG, determine a size of a mobile selector;
- cause the display device to graphically render, in the GUI, a position of the mobile selector on the playing field;
- determine whether the position of the rendered mobile selector encompasses a prize symbol;
- determine an outcome based on whether the position of the rendered mobile selector encompasses the prize symbol.

2. The system of claim 1, wherein the at least one processor determines the size of the mobile selector with reference to a lookup table having a distribution of sizes, the distribution of sizes weighted.

3. The system of claim 1, wherein the at least one processor determines the size of the mobile selector with reference to a distribution of sizes.

4. The system of claim 3, wherein the distribution of sizes are weighted to converges to a predetermined average size across the series of games.

5. The system of claim 1, wherein the at least one processor is further operative to:
- determine whether the mobile selector encompasses a bonus symbol;
- in the event the mobile selector encompasses the bonus symbol, take an action corresponding to the bonus symbol.

6. The system of claim 1, wherein the mobile selector moves on the playing field during a game.

7. The system of claim 1, wherein:
- the memory and the at least one processor are components of a first electronic device; and
- the display device is a component of a second electronic device.

8. The system of claim 1, wherein the at least one processor executes the instructions to cause the display device to graphically render the playing field in the GUI displayed by the display device by transmitting at least one communication to the second electronic device.

9. The system of claim 1, wherein a value associated with the prize symbol varies with a size of the mobile selector.

10. The system of claim 1, wherein a prize multiplier associated with the mobile selector varies with a size of the mobile selector.

11. The system of claim 1, wherein a prize multiplier associated with the mobile selector is randomly assigned.

12. The system of claim 1, wherein the size of the mobile selector converges to a predetermined average size across the series of games.

13. The system of claim 1, wherein the mobile selector is associated with a multiplier.

14. A method for utilizing a gaming device to graphically render a playing field including one or more symbols in a graphical user interface (GUI) of a display device and use a mobile selector graphically rendered within the playing field to a result of a game, comprising:

randomly, using a random number generator (RNG), determining a set of reels used to establish the playing field by randomly selecting each of the set of reels from a larger number of reels;

causing the display device to graphically render, in the GUI, the playing field by selecting portions of the set of reels to constitute the playing field by randomly, using the RNG, assigning each of the set of reels to a column of the playing field;

pseudo-randomly determining a position of the graphically rendered mobile selector within the playing field; and determining whether at least one portion of the selected portions of the set of reels within the determined position of the graphically rendered mobile selector includes a prize or bonus symbol; wherein:

across a number of games, offsetting a change in volatility due to pseudo-randomly determining the position of the graphically rendered mobile selector by a change in the volatility due to the randomly, using the RNG, assigning each of the set of reels to a column of the playing field.

15. The method of claim 14, wherein the operation of pseudo-randomly determining the position of the mobile selector comprises moving the mobile selector.

16. The method of claim 15, wherein moving the mobile selector comprises changing a size of the mobile selector.

17. The method of claim 15, wherein moving the mobile selector comprises extending the mobile selector.

18. A non-transitory computer-readable medium containing instructions which, when executed, cause at least one server connected to a gaming device to:

randomly, using a random number generator (RNG), determine a set of reels used to establish a playing field by randomly selecting each of the set of reels from a larger number of reels;

transmit data to cause a graphical user interface (GUI) displayed by a display device of the gaming device to graphically render the playing field, the playing field including one or more symbols selected by randomly, using the RNG, assigning each of the set of reels to a column of the playing field;

determine a size of a mobile selector;

pseudo-randomly determine a position of the mobile selector within the playing field by graphically rendering the mobile selector and moving the mobile selector according to a fixed movement component and a random movement component; and determine whether a portion of at least one reel of the set of reels within the determined position of the graphically rendered mobile selector includes a prize or bonus symbol.

19. The computer-readable medium of claim 18, wherein the size of the mobile selector is determined using a set of entries that are associated with probabilities of selection.

20. The computer-readable medium of claim 19, wherein at least some of the probabilities of selection differ from one another.

* * * * *